(12) United States Patent
Itakura et al.

(10) Patent No.: US 12,730,268 B2
(45) Date of Patent: Sep. 8, 2026

(54) OPTICAL WAVEGUIDE PACKAGE AND LIGHT-EMITTING DEVICE

(71) Applicant: KYOCERA Corporation, Kyoto (JP)

(72) Inventors: Yoshiaki Itakura, Aira (JP); Ryuuji Mori, Kagoshima (JP)

(73) Assignee: KYOCERA CORPORATION, Kyoto (JP)

( * ) Notice: Subject to any disclaimer, the term of this patent is extended or adjusted under 35 U.S.C. 154(b) by 325 days.

(21) Appl. No.: 18/543,761

(22) Filed: Dec. 18, 2023

(65) Prior Publication Data

US 2024/0272379 A1 Aug. 15, 2024

Related U.S. Application Data

(63) Continuation-in-part of application No. 17/763,274, filed as application No. PCT/JP2020/037009 on Sep. 29, 2020, now abandoned.

(30) Foreign Application Priority Data

Sep. 30, 2019 (JP) ................................ 2019-180926
Dec. 26, 2019 (JP) ................................ 2019-237069

(51) Int. Cl.
*G02B 6/42* (2006.01)
*G02B 6/36* (2006.01)

(52) U.S. Cl.
CPC ......... *G02B 6/4202* (2013.01); *G02B 6/3608* (2013.01); *G02B 6/4214* (2013.01)

(58) Field of Classification Search
CPC ............................ G02B 6/4202; G02B 6/3608
See application file for complete search history.

(56) References Cited

U.S. PATENT DOCUMENTS

| | | | |
|---|---|---|---|
| 4,750,799 | A | 6/1988 | Kawachi et al. |
| 5,802,222 | A | 9/1998 | Rasch et al. |
| 2003/0039455 | A1 | 2/2003 | Ouchi |
| 2010/0200983 | A1 | 8/2010 | Ono et al. |
| 2013/0177277 | A1 | 7/2013 | Fujiwara et al. |
| 2016/0274319 | A1 | 9/2016 | Krasulick et al. |
| 2016/0291269 | A1 | 10/2016 | Klein et al. |
| 2022/0350097 | A1 | 11/2022 | Itakura et al. |

FOREIGN PATENT DOCUMENTS

| | | | |
|---|---|---|---|
| JP | 61-046911 | A | 3/1986 |
| JP | 05-167060 | A | 7/1993 |
| JP | 08-110446 | A | 4/1996 |
| JP | 09-512353 | A | 12/1997 |
| JP | 11-337777 | A | 12/1999 |
| JP | 2002-107584 | A | 4/2002 |
| JP | 2004-064013 | A | 2/2004 |
| JP | 2009-003096 | A | 1/2009 |
| JP | 2010-016030 | A | 1/2010 |
| JP | 4579868 | B2 | 11/2010 |
| JP | 2011-253951 | A | 12/2011 |
| JP | 2014-186263 | A | 10/2014 |
| WO | 2016/183381 | A1 | 11/2016 |

*Primary Examiner* — Sung H Pak
(74) *Attorney, Agent, or Firm* — Volpe Koenig

(57) ABSTRACT

An optical waveguide package includes a substrate, and an optical waveguide layer on an upper surface of the substrate. The optical waveguide layer includes a cladding and a core in the cladding. The cladding has at least one first recess having a bottom surface and a first inner wall surface surrounding the bottom surface. The first inner wall surface of the at least one first recess is inclined and has an upper side outward from a lower side.

19 Claims, 17 Drawing Sheets

OPTICAL WAVEGUIDE PACKAGE AND LIGHT-EMITTING DEVICE

CROSS-REFERENCE TO RELATED APPLICATIONS

This application is a continuation-in-part application of U.S. patent application Ser. No. 17/763,274, which is a U.S. National Phase Application of International Application No. PCT/JP 2020/037009 filed on Sep. 29, 2020 claiming priority to Japanese Patent Application No. 2019-180926 filed on Sep. 30, 2019 and No. 2019-237069 filed on Dec. 26, 2019, the entire disclosure of which is incorporated herein by reference.

BACKGROUND OF INVENTION

Field of Invention Field

The present disclosure relates to an optical waveguide package and a light-emitting device.

Description of Related Art Background

Known techniques are described in, for example, Patent Literature 1 (Japanese Unexamined Patent Application Publication No. 61-46911) and Patent Literature 2 (Japanese Patent No. 457968).

SUMMARY OF THE INVENTION

An optical waveguide package according to an aspect of the present disclosure includes a substrate, and an optical waveguide layer on an upper surface of the substrate. The optical waveguide layer includes a cladding and a core in the cladding. The cladding has at least one first recess having a bottom surface and a first inner wall surface surrounding the bottom surface. The first inner wall surface of the at least one first recess is inclined and has an upper side outward from a lower side.

A light-emitting device according to another aspect of the present disclosure includes the above optical waveguide package, and at least one light-emitting element accommodated in the at least one first recess in the optical waveguide package.

BRIEF DESCRIPTION OF DRAWINGS

FIG. 30 is an enlarged cross-sectional view of a recess in an optical waveguide package according to a nineteenth embodiment of the present disclosure.

DETAILED DESCRIPTION

Figure 1:
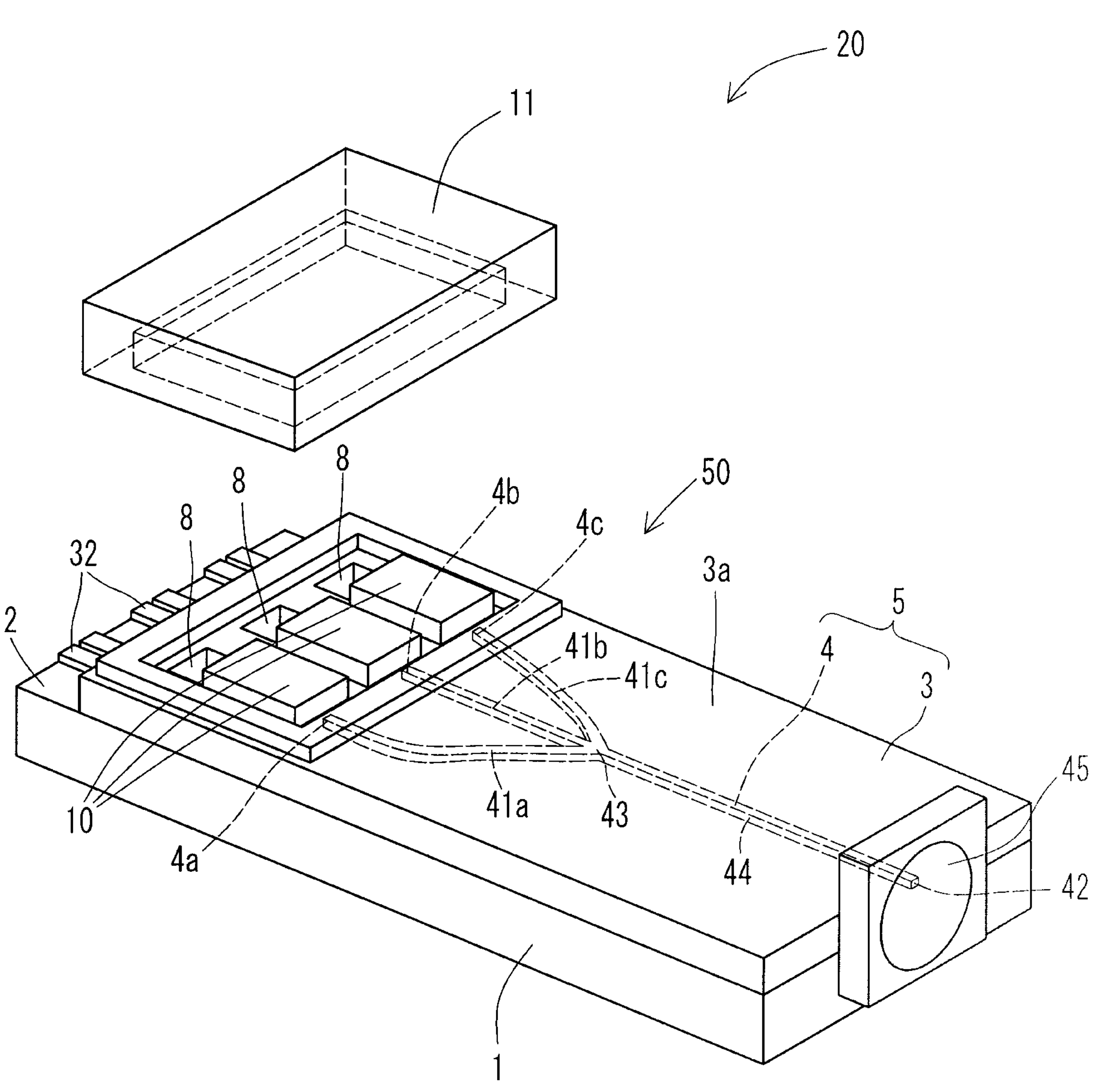
FIG. 1 is an exploded perspective view of a light-emitting device including an optical waveguide package according to a first embodiment of the present disclosure.
Figure 2:
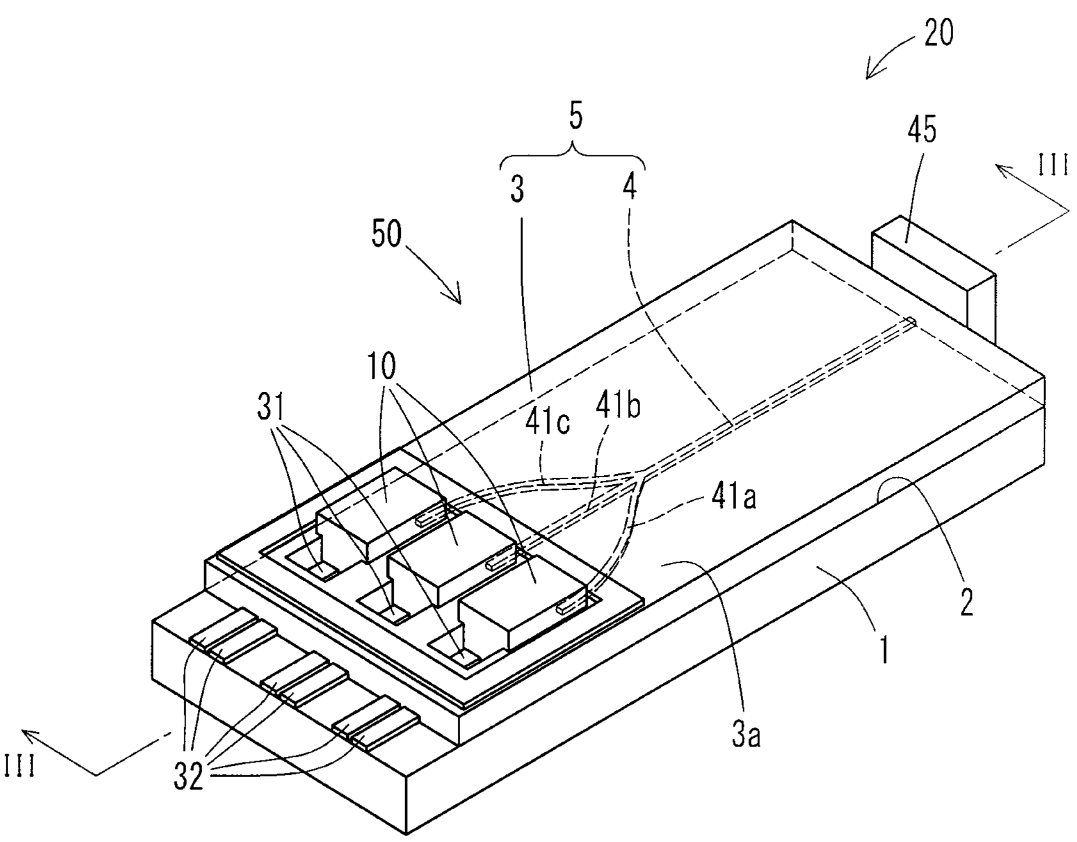
FIG. 2 is a perspective view of the light-emitting device in FIG. 1 without showing a lid.
Figure 3:
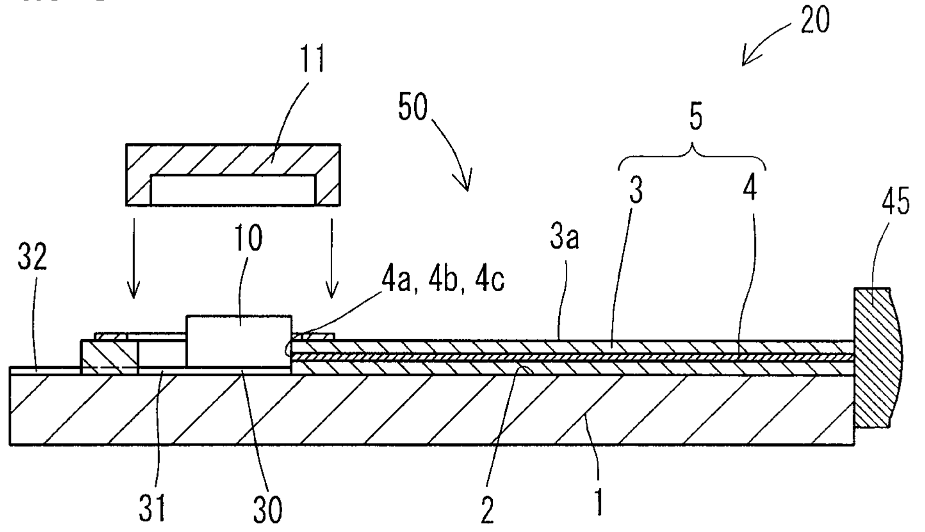
FIG. 3 is a cross-sectional view of the light-emitting device taken along section line III-III in FIG. 2.
Figure 4:
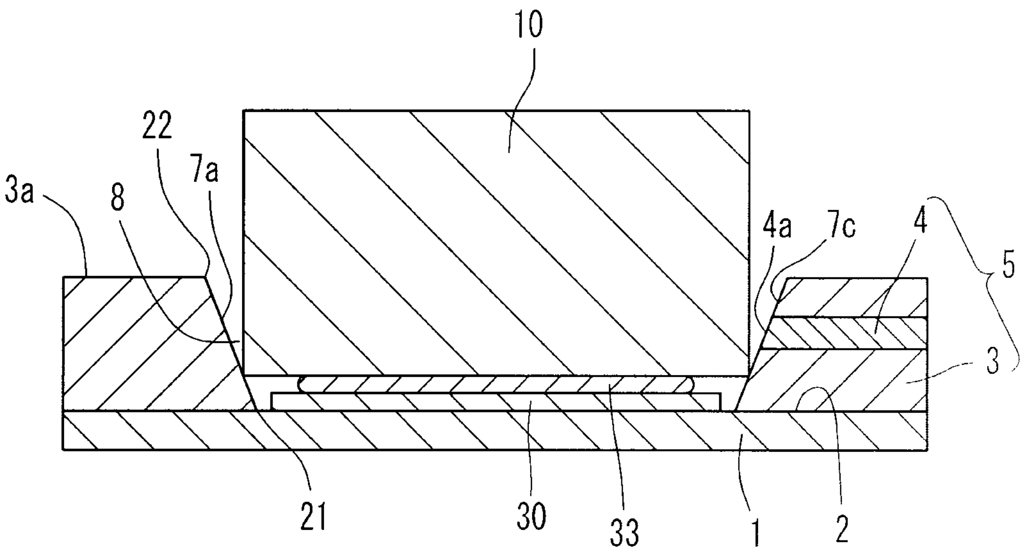
FIG. 4 is an enlarged cross-sectional view of a first recess.
Figure 5:
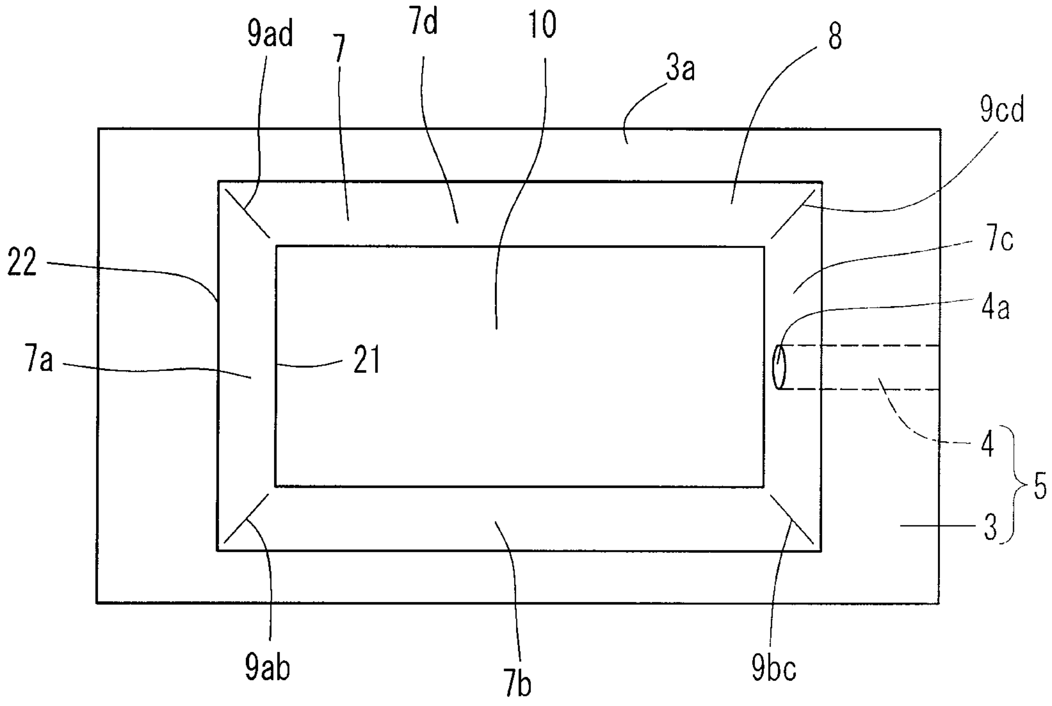
FIG. 5 is a plan view of the first recess in FIG. 4 as viewed from above.

An optical waveguide package with the structure that forms the basis of an optical waveguide package according to one or more aspects of the present disclosure and a light-emitting device including the optical waveguide package are described in, for example, Patent Literature 1. The structure that forms the basis of an optical waveguide package according to one or more aspects of the present disclosure includes a quartz glass optical waveguide located on a silicon substrate, light-emitting and light-receiving elements optically coupled to different end faces of the optical waveguide and bonded onto the silicon substrate, and an optical fiber connected to another end face of the optical waveguide.

The optical waveguide, the light-emitting and light-receiving elements, and the optical fiber are positioned to have their optical axes aligned with one another with the light-emitting and light-receiving elements and the optical fiber in contact with the end faces of the optical waveguide. The light-emitting and light-receiving elements and the optical fiber each have a dimension corresponding to the thickness of the optical waveguide and are thus positioned vertically relative to the silicon substrate. The structure that forms the basis of an optical waveguide package according to one or more aspects of the present disclosure is to include smaller components and allow easier positioning.

An optical waveguide package with the structure that forms the basis of another optical waveguide package according to one or more aspects of the present disclosure and a light-emitting device including the optical waveguide package are described in, for example, Patent Literature 2. The structure that forms the basis of an optical waveguide package according to one or more aspects of the present disclosure includes a gas barrier optical waveguide including a non gas-barrier core and a non gas-barrier cladding coated with a gas barrier thin film, a gas barrier cap, an optical element including a light emitter or a light receiver mounted on the optical waveguide at a position to be optically coupled to the core, and a metal wiring member electrically connected to the optical element on the optical waveguide. In the known structure, the thin film on the optical waveguide and the cap are joined together with a gas barrier inorganic material layer in between. A space for accommodating one end of the core and the optical element can thus be defined and airtightly sealed by gas barrier members alone.

The structures described in Patent Literatures 1 and 2 that form the basis of an optical waveguide package according to one or more aspects of the present disclosure include no structure that can accommodate thermal expansion of the light-emitting and light-receiving elements. Thermal expansion of the light-emitting and light-receiving elements may cause misalignment of the optical axis between the optical waveguide, the light-emitting and light-receiving elements, and the optical fiber, or may cause deformation or damage of the light-emitting and light-receiving elements and components in contact with these elements.

An optical waveguide package according to one or more embodiments of the present disclosure and a light-emitting device including the optical waveguide package will now be described with reference to the drawings.

First Embodiment

An optical waveguide package 50 shown in FIGS. 1 to 5 includes a substrate 1 and an optical waveguide layer 5. The optical waveguide layer 5 is on an upper surface 2 of the substrate 1 and includes a cladding 3 and a core 4 in the cladding 3. The cladding 3 has multiple first recesses 8 each having a bottom surface 6 and a first inner wall surface 7 surrounding the bottom surface 6. The first inner wall surface 7 is inclined and has an upper side 22 outward from a lower side 21. The first recesses 8 each define an element-receiving portion. A lid 11 is placed to cover the first recesses 8.

The optical waveguide package 50 according to the present embodiment has multiple first recesses 8 each accommodating a light-emitting element 10. The optical waveguide package 50 and the light-emitting elements 10 form a light-emitting device 20. The light-emitting elements 10 may be laser diodes. The optical waveguide layer 5 includes the core 4 and the cladding 3 integral with each other. The substrate 1 may include multiple dielectric layers stacked on one another. The optical waveguide package 50 may have three first recesses 8 for three light-emitting elements 10 for red (R) light, green (G) light, and blue (B) light. Each first recess 8 may receive one light-emitting element 10.

The substrate 1 may be a ceramic wiring board including dielectric layers containing a ceramic material. Examples of the ceramic material used for the ceramic wiring board include sintered aluminum oxide, sintered mullite, sintered silicon carbide, sintered aluminum nitride, and sintered glass ceramic. For the substrate 1 being a ceramic wiring board, the dielectric layers may include conductors such as connection pads 30, internal wiring conductors 31, and external connection terminals 32 for electrical connection between the light-emitting elements 10 (or light-receiving elements) and an external circuit. The light-emitting elements 10 may include electrodes connected to the connection pads 30 using a conductive bond 33.

The substrate 1 may be an organic wiring board including dielectric layers containing an organic material. The organic wiring board may be a printed wiring board, a build-up wiring board, or a flexible wiring board. Examples of the organic material used for the organic wiring board include an epoxy resin, a polyimide resin, a polyester resin, an acrylic resin, a phenolic resin, and a fluororesin.

The optical waveguide layer 5 may be glass such as quartz, or a resin. In the optical waveguide layer 5, both the core 4 and the cladding 3 may be formed from glass or a resin. In this case, the core 4 has a higher refractive index than the cladding 3. The difference in the refractive index causes total internal reflection of light. More specifically, a material with a higher refractive index is used to form a path, which is then surrounded by a material with a lower refractive index. This structure confines light in the core 4 with the higher refractive index.

The core 4 has multiple incident end faces 4*a*, 4*b*, and 4*c* and one emission end face 42. The core 4 defines a merging path including multiple branching paths 41*a*, 41*b*, and 41*c*, a merging portion 43, and a joined path 44 between the incident end faces 4*a*, 4*b*, and 4*c* and the emission end face 42. The branching paths 41*a*, 41*b*, and 41*c* respectively have the incident end faces 4*a*, 4*b*, and 4*c* at one end. The merging portion 43 merges the branching paths 41*a*, 41*b*, and 41*c* together. The joined path 44 has the emission end face 42 at one end. The core 4 may have the incident end faces 4*a*, 4*b*, and 4*c* each having an exposed portion.

The device may include multiple condenser lenses 45 for the respective incident end faces 4*a*, 4*b*, and 4*c*. The condenser lens 45 is located opposite to the incident end faces 4*a*, 4*b*, and 4*c* of the core 4. The condenser lens 45 has an optical axis aligned with the central axis of each of the incident end faces 4*a*, 4*b*, and 4*c*.

Red light, green light, and blue light emitted from the respective light-emitting elements 10 enter the respective branching paths 41*a*, 41*b*, and 41*c* through the incident end faces 4*a*, 4*b*, and 4*c* and pass through the merging portion 43 and the joined path 44 to the condenser lens 45, through which the light is condensed and emitted.

The condenser lens 45 is, for example, a plano-convex lens with a flat incident surface and a convex emission surface. The optical waveguide layer 5, the light-emitting elements 10, and the condenser lens 45 are assembled together to have the branching paths 41*a*, 41*b*, and 41*c* each with its optical axis aligned with the center of the light emitter of the corresponding light-emitting element 10.

Each first recess 8 has the first inner wall surface 7 including multiple wall surfaces 7*a*, 7*b*, 7*c*, and 7*d* and corner support surfaces 9*ab*, 9*bc*, 9*cd*, and 9*ad*. The corner support surfaces 9*ab*, 9*bc*, 9*cd*, and 9*ad* are each located between a first wall surface and a second wall surface of the wall surfaces 7*a*, 7*b*, 7*c*, and 7*d* adjacent to each other. The wall surfaces 7*a*, 7*b*, 7*c*, and 7*d* and the corner support surfaces 9*ab*, 9*bc*, 9*cd*, and 9*ad* are each inclined and have an upper side outward from a lower side. In other words, each first recess 8 has the wall surfaces 7*a*, 7*b*, 7*c*, and 7*d* and the corner support surfaces 9*ab*, 9*bc*, 9*cd*, and 9*ad* inclined outward toward the opening of the first recess 8. The corner support surfaces 9*ab*, 9*bc*, 9*cd*, and 9*ad* support the external corners of a light-emitting element 10, thus reducing misalignment or misorientation of the light-emitting element 10. The optical waveguide layer may thermally expand with heat from the light-emitting elements in use. The optical waveguide package 50 with the above structure reduces the contact area and thus reduces damage to the cladding 3 from, for example, thermal expansion. The optical waveguide package 50 with the above structure allows light to be efficiently coupled to the optical waveguide layer 5. The cross section of the device taken in the thickness direction can show whether the surfaces are inclined.

Second Embodiment

Figure 6:
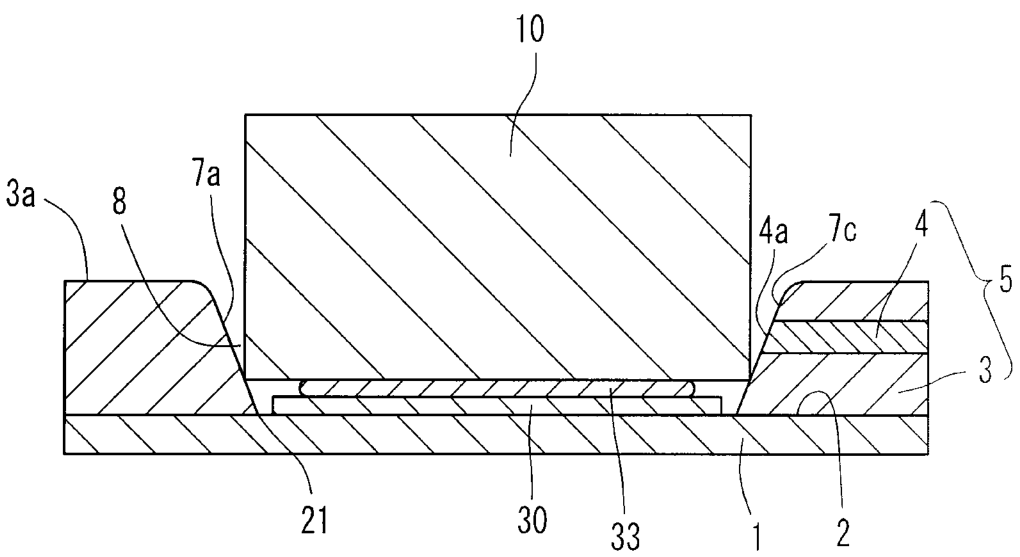
FIG. 6 is an enlarged cross-sectional view of a first recess in a light-emitting device according to a second embodiment of the present disclosure.
Figure 7:
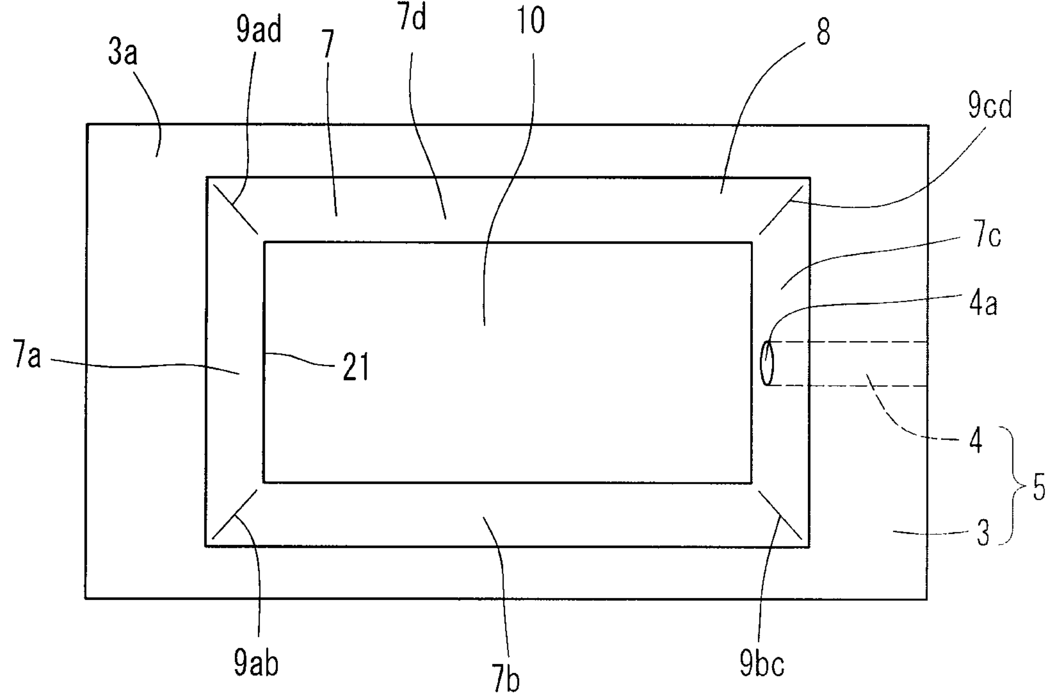
FIG. 7 is a plan view of the light-emitting device in FIG. 6.

FIGS. 6 and 7 show a light-emitting device according to a second embodiment of the present disclosure. The components corresponding to those in the above embodiment are given the same reference numerals and will not be described repeatedly. Each first recess 8, or an element-receiving portion, may have the opening with a curved edge (or a surface convex inside) as shown in section in FIG. 6. This can reduce damage from, for example, cracks in the inclined surfaces under thermal stress. The above structure can also reduce the reflection of stray light from the light-emitting elements 10. Being inside herein refers to being toward the inner wall of the first recess 8. Being outside herein refers to being toward the outer wall of the first recess 8.

Third Embodiment

Figures 8, 9:
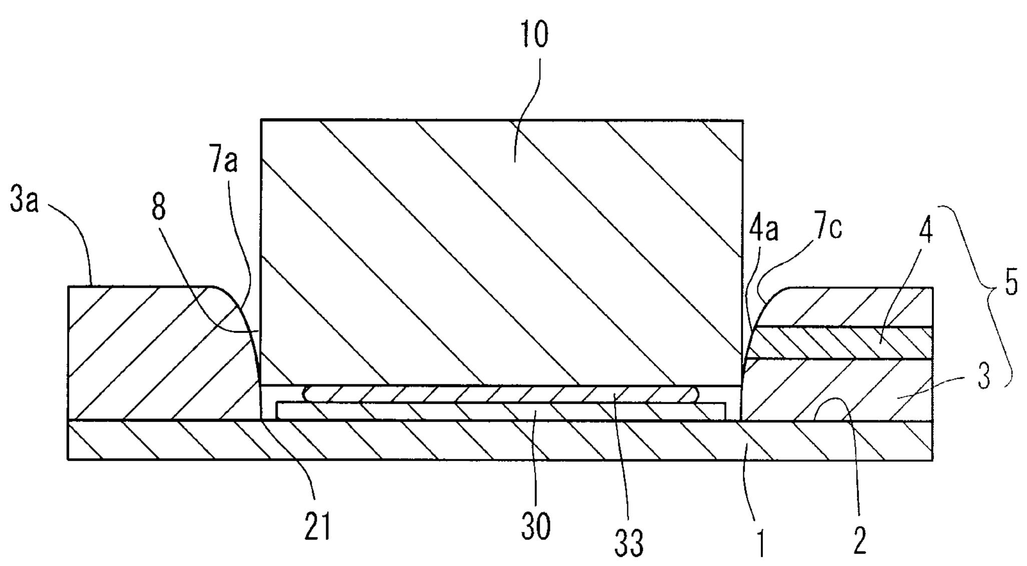
FIG. 8 is a cross-sectional view of a light-emitting device according to a third embodiment of the present disclosure.
FIG. 9 is a plan view of the light-emitting device in FIG. 8.

FIGS. 8 and 9 show a light-emitting device according to a third embodiment of the present disclosure. The components corresponding to those in the above embodiments are given the same reference numerals and will not be described repeatedly. Each first recess 8, or an element-receiving portion, may have convex corner support surfaces 9*ab*, 9*bc*, 9*cd*, and 9*ad*. This can reduce damage from, for example, cracks in the inclined surfaces under thermal stress. The core 4 having end faces convex inside allows light from the light-emitting elements 10 to easily enter the core 4. The wall surfaces 7*a*, 7*b*, 7*c*, and 7*d* may also be convex.

Fourth Embodiment

Figure 10:
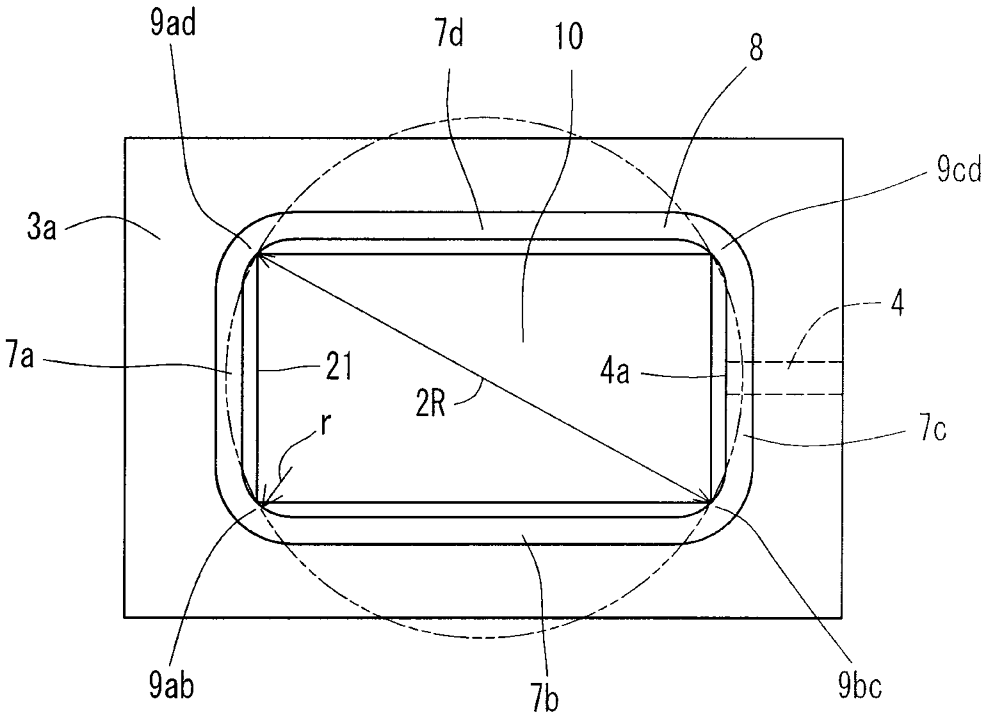
FIG. 10 is a plan view of a light-emitting device according to a fourth embodiment of the present disclosure.

FIG. 10 shows a light-emitting device according to a fourth embodiment of the present disclosure. The components corresponding to those in the above embodiments are given the same reference numerals and will not be described repeatedly. An arc of a circle circumscribed on a light-emitting element 10, or in other words, a circle with its diameter being a diagonal 2R of a light-emitting element 10, is defined imaginarily in a plan view. The corner support surfaces 9*ab*, 9*bc*, 9*cd*, and 9*ad* may be curved (concave inside, or in other words, convex outside). The optical waveguide with this structure has the corner support surfaces 9*ab*, 9*bc*, 9*cd*, and 9*ad* in point contact with the lower edges of the light-emitting element 10, allowing a small contact area. This relaxes stress on the light-emitting element 10 caused by thermal expansion. The corner support surfaces 9*ab*, 9*bc*, 9*cd*, and 9*ad* each may have a curvature radius r smaller than R to support the light-emitting element 10 without being misoriented on the sidewalls of the optical waveguide. The corner support surfaces 9*ab*, 9*bc*, 9*cd*, and 9*ad* concave in a plan view can reduce damage from, for example, deformation and cracks in the sidewalls under thermal stress.

Fifth Embodiment

Figure 11:
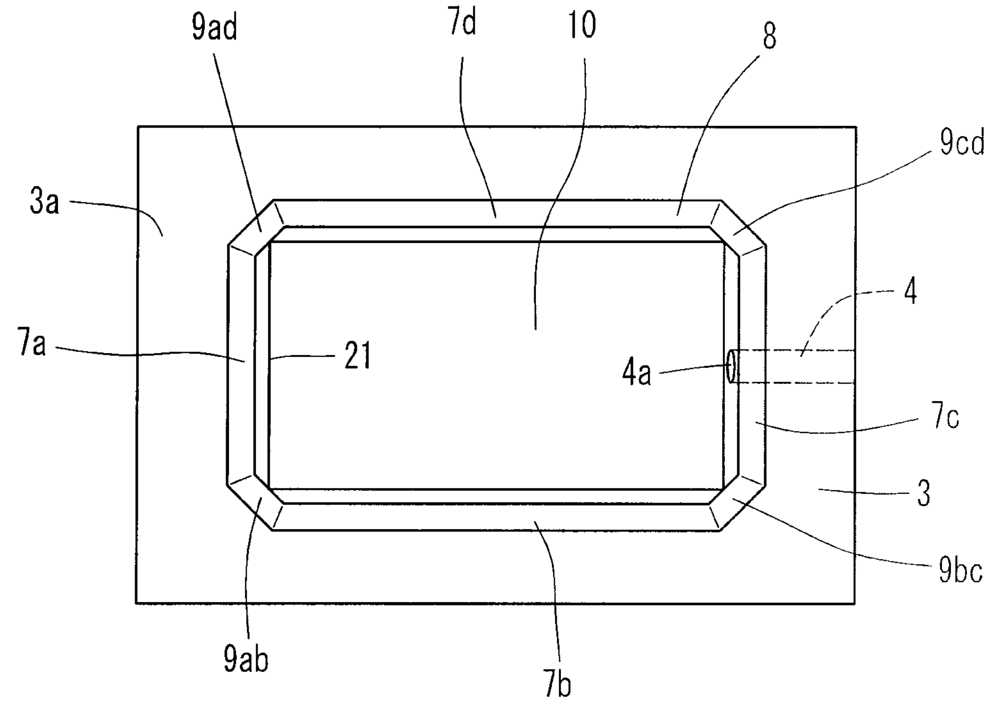
FIG. 11 is a plan view of a light-emitting device according to a fifth embodiment of the present disclosure.

FIG. 11 shows a light-emitting device according to a fifth embodiment of the present disclosure. The components corresponding to those in the above embodiments are given the same reference numerals and will not be described repeatedly. The corner support surfaces 9*ab*, 9*bc*, 9*cd*, and 9*ad* in the wall surfaces 7*a*, 7*b*, 7*c*, and 7*d* may be flat in a plan view. The flat corner support surfaces 9*ab*, 9*bc*, 9*cd*, and 9*ad* can be in point contact with and support the light-emitting element 10. This reduces misorientation of the light-emitting element 10, similarly with the curved corner support surfaces 9*ab*, 9*bc*, 9*cd*, and 9*ad*. The boundaries between the wall surfaces 7*a*, 7*b*, 7*c*, and 7*d* and the corner support surfaces 9*ab*, 9*bc*, 9*cd*, and 9*ad* may be curved. This reduces damage from, for example, deformation and cracks in the wall surfaces 7*a*, 7*b*, 7*c*, and 7*d* under thermal stress.

Sixth Embodiment

Figure 12:
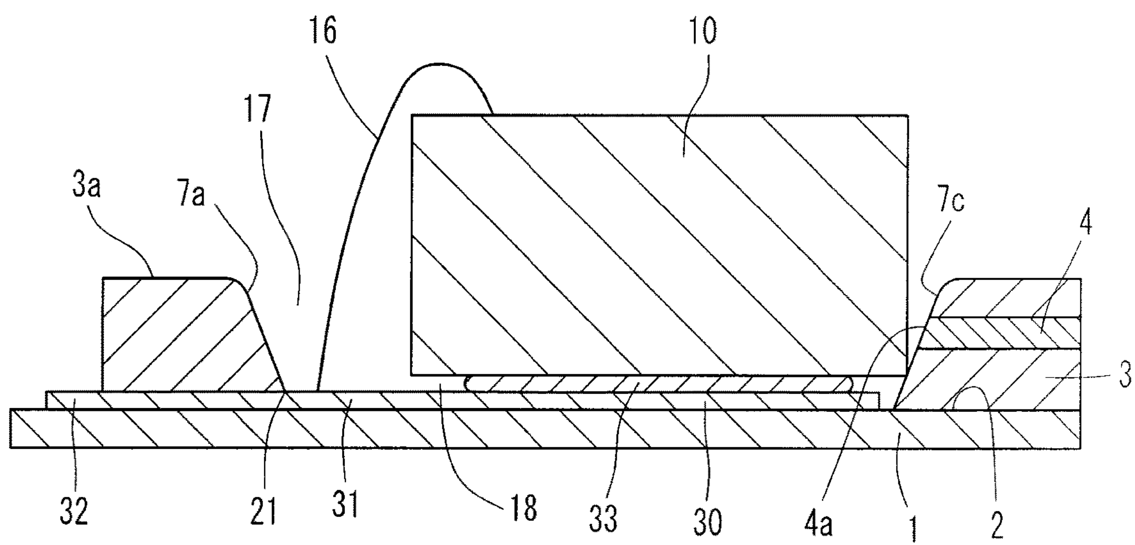
FIG. 12 is a cross-sectional view of a light-emitting device according to a sixth embodiment of the present disclosure.
Figure 13:
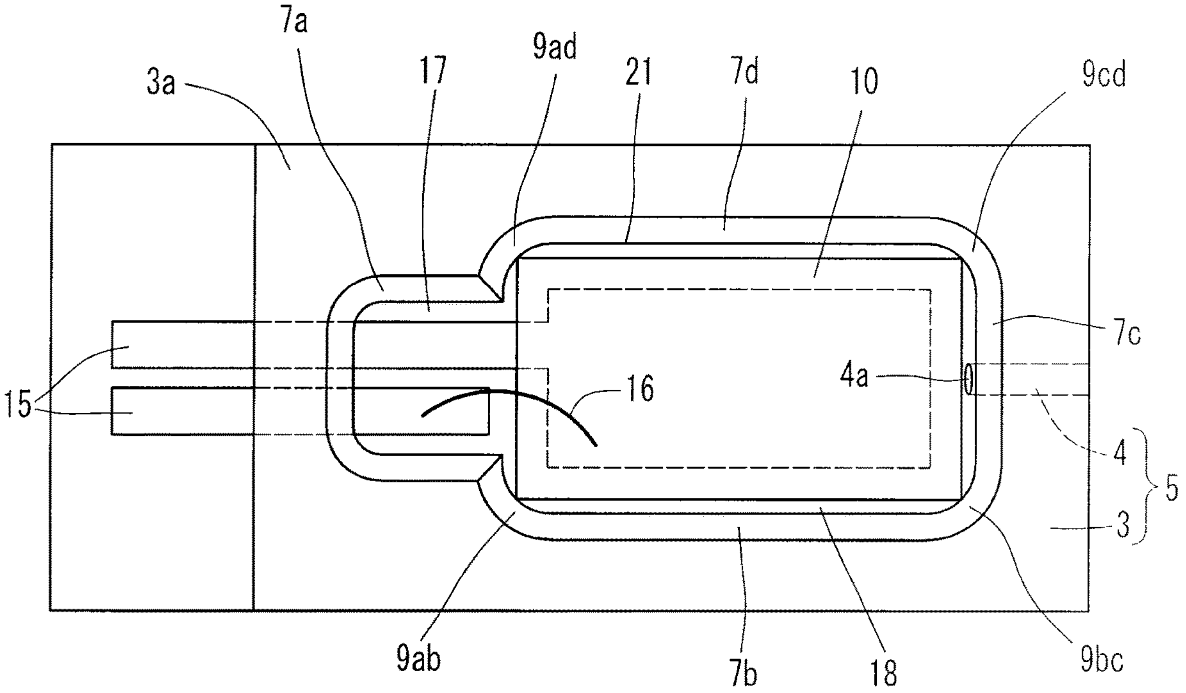
FIG. 13 is a plan view of the light-emitting device in FIG. 12.
Figure 14:
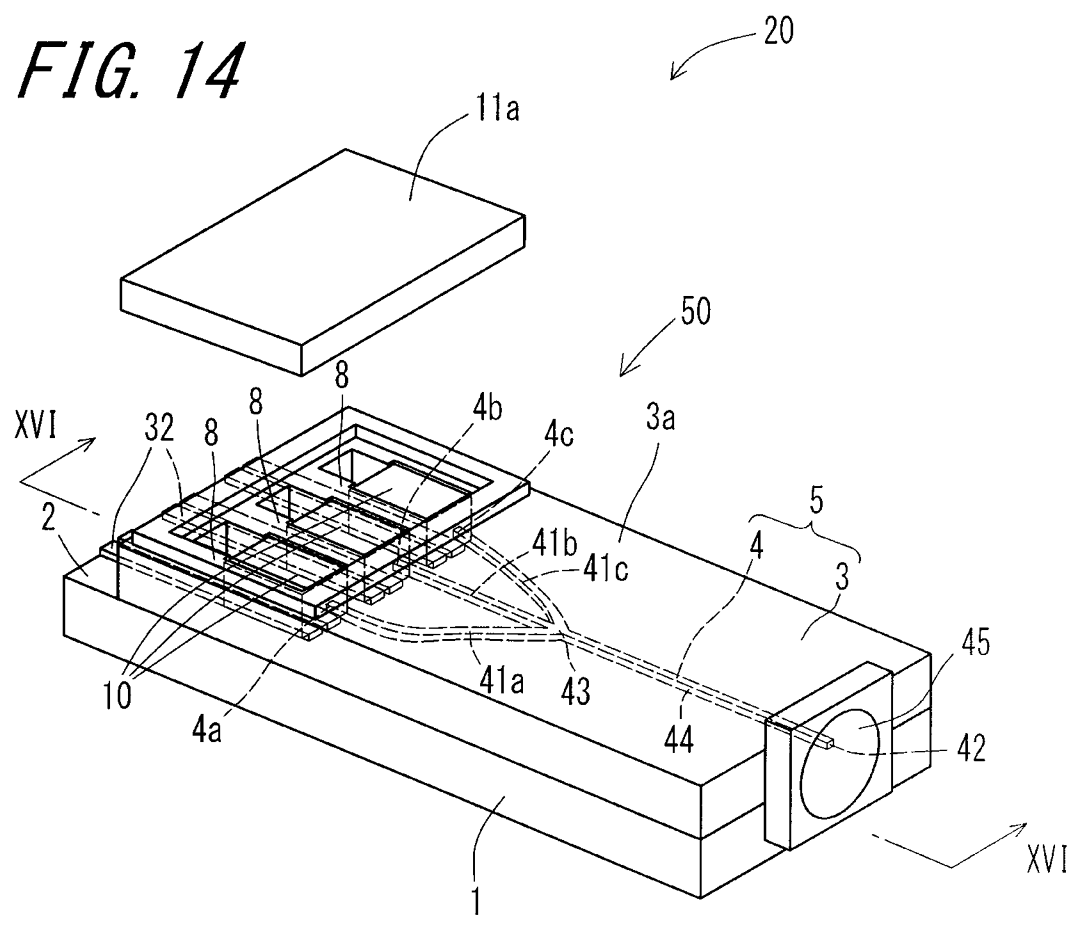
FIG. 14 is an exploded perspective view of a light-emitting device according to a seventh embodiment of the present disclosure.
Figure 15:
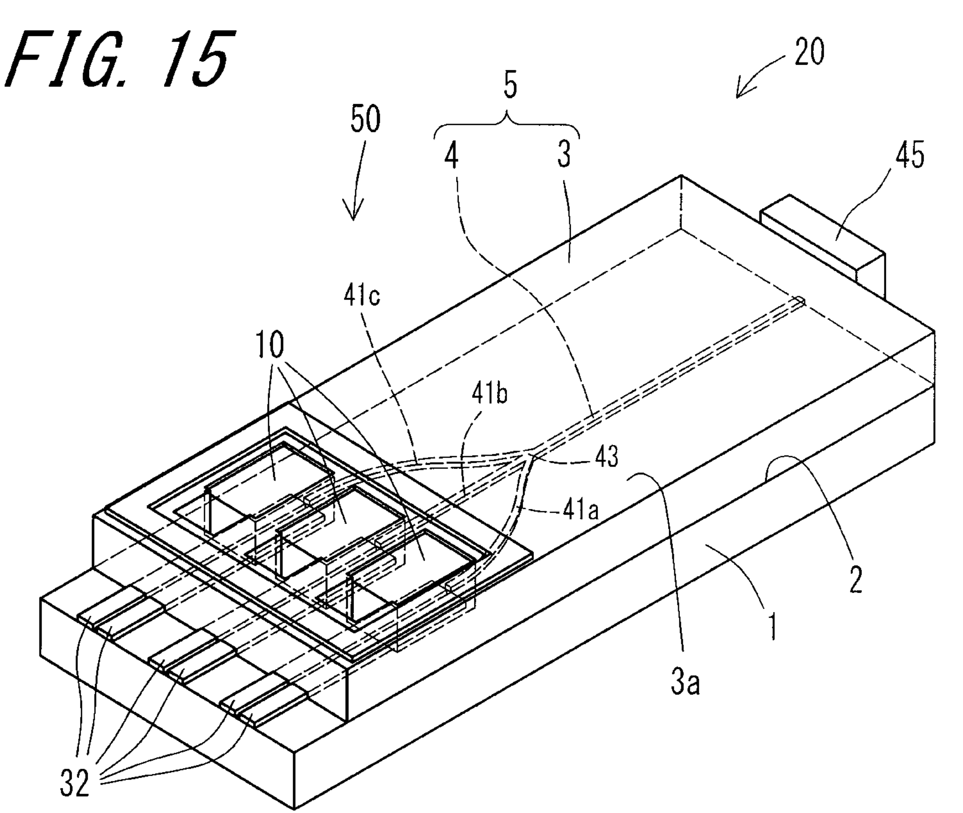
FIG. 15 is a perspective view of the light-emitting device in FIG. 14 without showing a lid.
Figure 16:
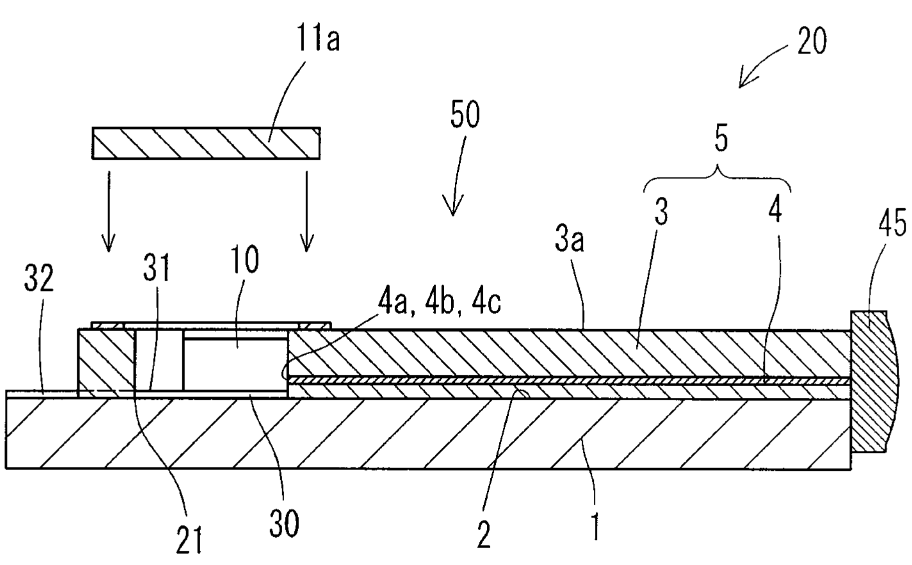
FIG. 16 is a cross-sectional view of the light-emitting device taken along section line XVI-XVI in FIG. 14.
Figure 17:
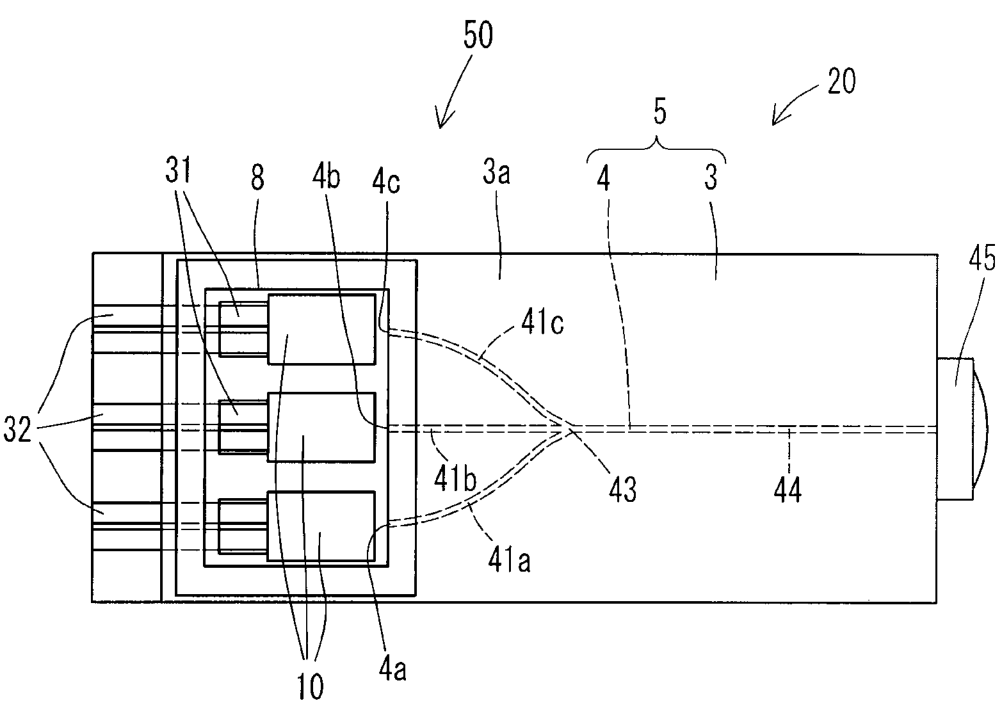
FIG. 17 is a plan view of the light-emitting device in each of FIGS. 14 to 16.

FIGS. 12 and 13 show a light-emitting device according to a sixth embodiment of the present disclosure. The components corresponding to those in the above embodiments are given the same reference numerals and will not be described repeatedly. The light-emitting device includes additional spaces protruding and continuous with the wall surfaces 7*a*, 7*b*, 7*c*, or 7*d* other than the corner support surfaces 9*ab*, 9*bc*, 9*cd*, and 9*ad*. The additional spaces can accommodate electrodes for power supply with the light-emitting elements 10 being supported. The additional spaces are referred to as second spaces 17. The spaces to accommodate the light-emitting elements 10 are referred to as first spaces 18. The light-emitting elements 10 can be electrically connected to the electrodes with metal wiring members. Each second space 17 may have wall surfaces 7*a*, 7*b*, 7*c*, and 7*d* inclined to define a larger opening. The larger opening allows the metal wiring members and collets for connecting the wiring members to avoid contacting the sidewalls and reduces failures caused by, for example, wire breakage.

Seventh Embodiment

FIGS. 14 to 17 show a light-emitting device according to a seventh embodiment of the present disclosure. The components corresponding to those in the above embodiments are given the same reference numerals and will not be described repeatedly. In the above embodiments, the light-emitting elements 10 include upper portions protruding from the first recesses 8. The protruding portions are covered with the box-shaped lid 11. In another embodiment, the first recesses 8 may each accommodate the entire light-emitting element 10 and may be covered and sealed with a plate-like lid 11*a*. The optical waveguide package 50 with this structure simplifies the lid 11*a*.

Eighth Embodiment

Figure 18:
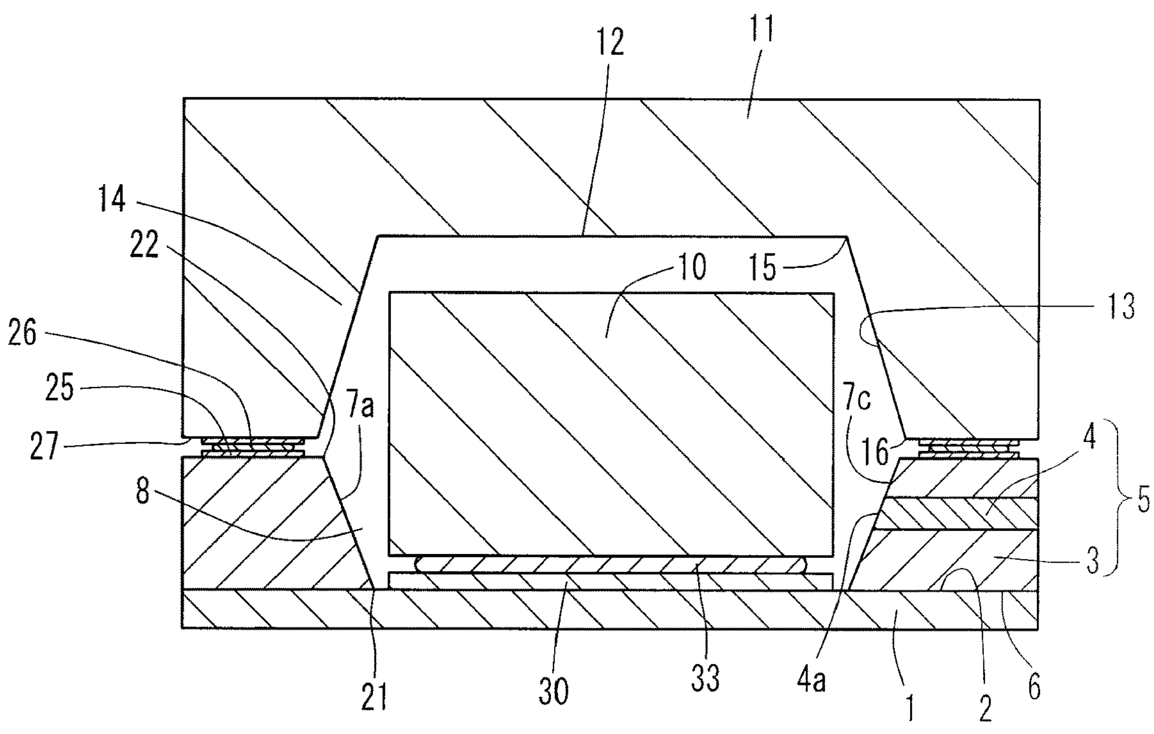
FIG. 18 is an enlarged cross-sectional view of a recess in an optical waveguide package according to an eighth embodiment of the present disclosure.

FIG. 18 shows a recess in an optical waveguide package according to an eighth embodiment of the present disclosure. The components corresponding to those in the above embodiments are given the same reference numerals and will not be described repeatedly. First recesses 8 or second recesses 14 may be simply referred to as recesses. A light-emitting device 20 according to the present embodiment includes a substrate 1 and an optical waveguide layer 5. The optical waveguide layer 5 is on an upper surface 2 of the substrate 1 and includes a cladding 3 and a core 4 in the cladding 3. The cladding 3 has multiple first recesses 8 each having a bottom surface 6 and a first inner wall surface 7 surrounding the bottom surface 6. The first inner wall surface 7 is inclined and has an upper side 22 outward from a lower side 21. The first recesses 8 each define an element-receiving portion. A lid 11 is placed to cover the first recesses 8. The lid 11 may be formed from the same material as the cladding 3, such as glass (e.g., quartz) or a resin.

The lid 11 may have a second recess 14 having a top surface 12 facing the bottom surface 6 of the cladding 3, and a second inner wall surface 13 surrounding the top surface 12. The second inner wall surface 13 is inclined and has a lower side 16 outward from an upper side 15. The lid 11 has a first surface 27 outward from the lower side 16 of the second inner wall surface 13. The first surface 27 defines the mounting surface to be mounted on a first upper surface 3*a* of the cladding 3.

A first gas barrier layer 25 is formed on the first upper surface 3*a* of the cladding 3 to surround the opening of each first recess 8 by, for example, plasma-enhanced chemical vapor deposition (CVD) or sputtering. The lid 11 is joined to the first gas barrier layer 25 with a bond 26 to airtightly seal the space accommodating the light-emitting elements 10. The first gas barrier layer 25 may be formed from an inorganic material mainly containing, for example, silicic acid, silicon nitride, silicon oxynitride, aluminum oxide, or diamond-like carbon. The first gas barrier layer 25 allows the space accommodating the light-emitting elements 10 to be more airtight than using the bond 26 alone to join the lid 11 to the first upper surface 3*a* of the cladding 3. The first gas barrier layer 25 also reduces entry of moisture or other external substances into the space. This reduces operation failures of the light-emitting elements 10 caused by moisture or other substances and allows the optical waveguide package to be reliable.

In the present embodiment, the lid 11 has the second inner wall surface 13 inclined outward from the upper side 15 to the lower side 16. The optical waveguide layer 5 and the lid 11 joined together define an internal space hexagonal in cross section, or in other words, in the shape of a polygonal prism close to a cylinder. This structure has a stress distribution with smaller variations in stress and is thus less likely to deform. The first inner wall surface 7 and the second inner wall surface 13 adjacent to each other in the circumferential direction are inclined to form a corner with an obtuse angle. This reduces cracks caused by thermal expansion and contraction and thus reduces breakage and deformation resulting from cracks.

Ninth Embodiment

Figure 19:
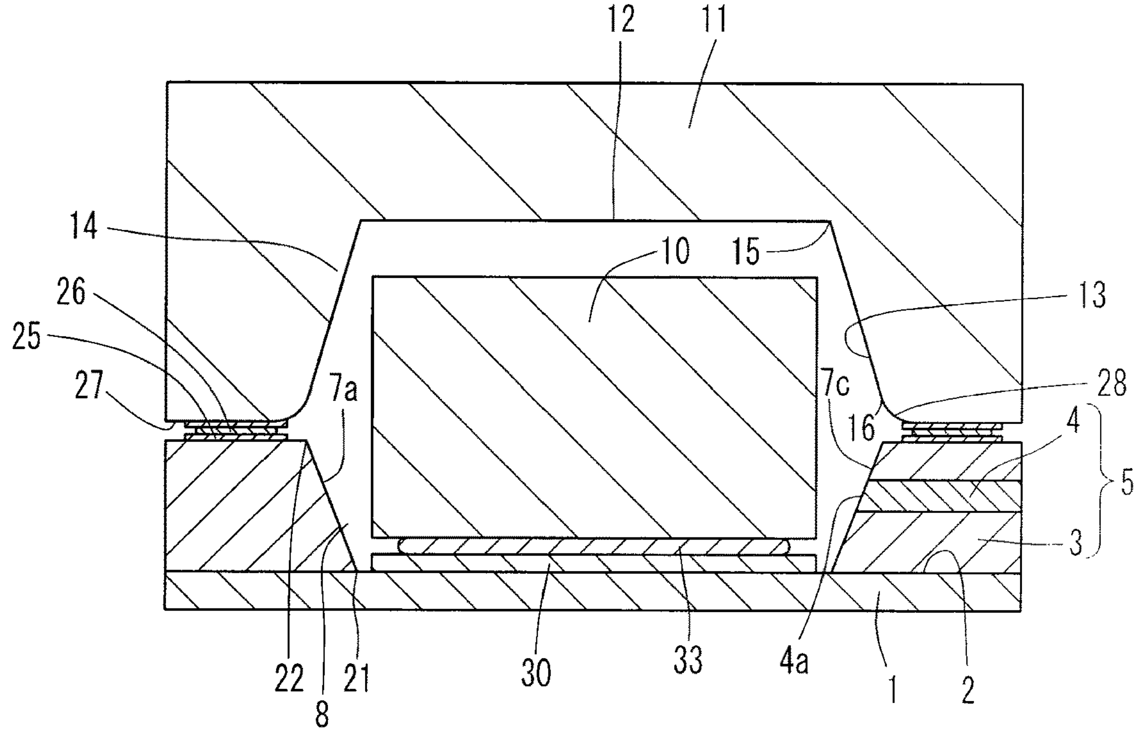
FIG. 19 is an enlarged cross-sectional view of a recess in an optical waveguide package according to a ninth embodiment of the present disclosure.

FIG. 19 shows a recess in an optical waveguide package according to a ninth embodiment of the present disclosure. The components corresponding to those in the above embodiments are given the same reference numerals and will not be described repeatedly. In a light-emitting device 20 according to the present embodiment, the lid 11 has a first surface 27 outward from the lower side 16 of the second inner wall surface 13, and a second surface 28 convex inside between the first surface 27 and the lower side 16 of the second inner wall surface 13.

The light-emitting device 20 with this structure includes the lid 11 having a curved inner edge, and thus reduces damage from, for example, cracks in the lid 11 under thermal stress. This also reduces misalignment between the incident end faces 4*a* to 4*c* of the core 4 and light from the emission portions of the light-emitting elements 10 caused by thermal expansion of the optical waveguide layer 5, thus allowing efficient optical coupling.

Tenth Embodiment

Figure 20:
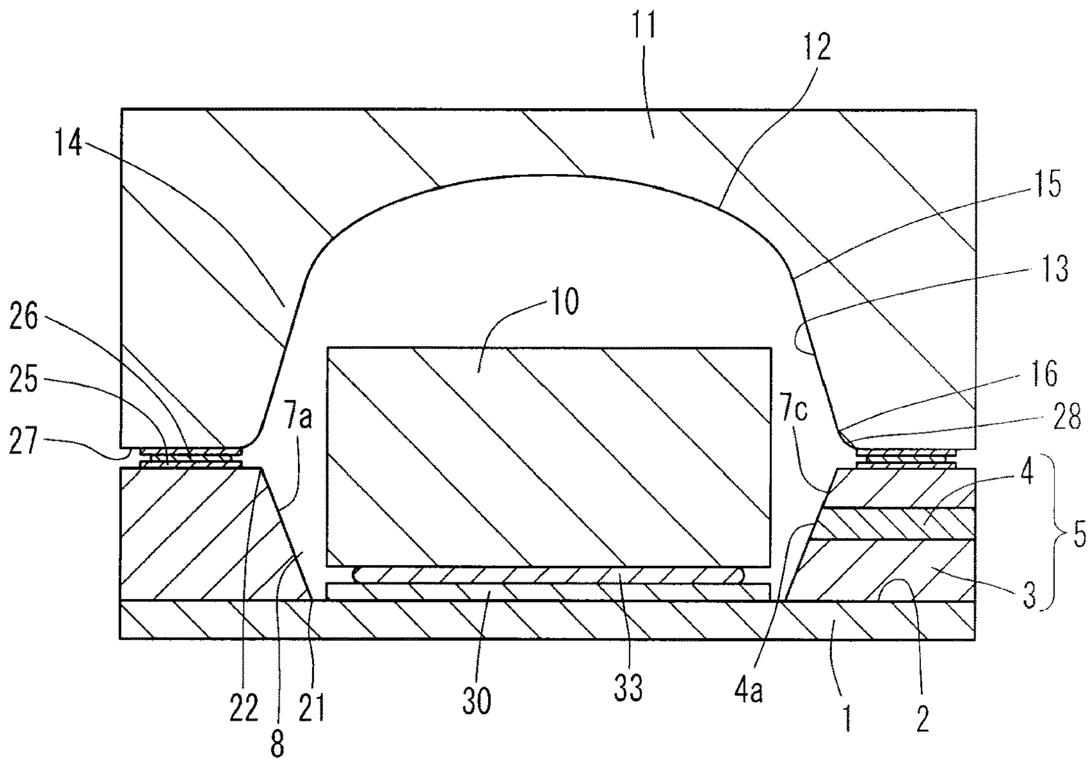
FIG. 20 is an enlarged cross-sectional view of a recess in an optical waveguide package according to a tenth embodiment of the present disclosure.

FIG. 20 shows a recess in an optical waveguide package according to a tenth embodiment of the present disclosure. The components corresponding to those in the above embodiments are given the same reference numerals and will not be described repeatedly. In a light-emitting device 20 according to the present embodiment, the top surface 12 is concave inside, the second inner wall surface 13 is flat, and the second surface 28 is convex inside between the first surface 27 and the lower side 16 of the second inner wall surface 13.

The light-emitting device 20 with this structure includes the lid 11 having the curved second inner wall surface 13. This reduces deformation of the optical waveguide layer 5 under thermal stress and also reduces damage from, for example, cracks at the joint interface between the lid 11 and the cladding 3. This also reduces misalignment between the incident end faces 4*a* to 4*c* of the core 4 and light from the emission portions of the light-emitting elements 10 caused by thermal expansion, thus allowing efficient optical coupling.

Eleventh Embodiment

Figure 21:
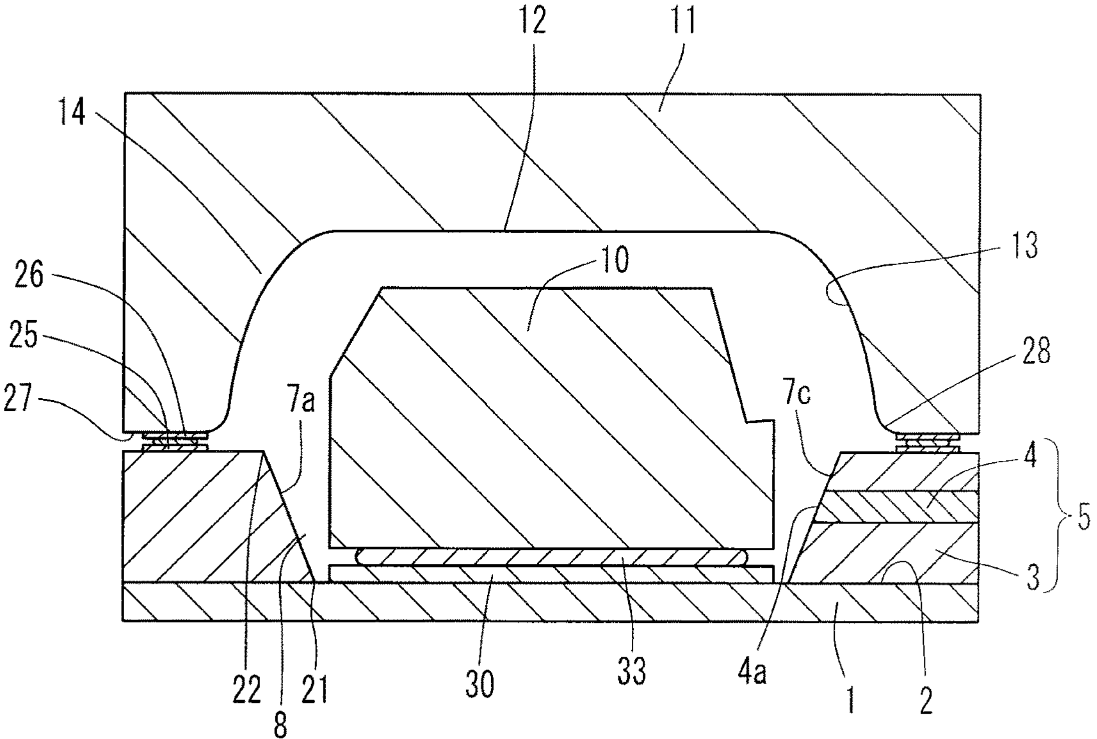
FIG. 21 is an enlarged cross-sectional view of a recess in an optical waveguide package according to an eleventh embodiment of the present disclosure.

FIG. 21 shows a recess in an optical waveguide package according to an eleventh embodiment of the present disclosure. The components corresponding to those in the above embodiments are given the same reference numerals and will not be described repeatedly. In a light-emitting device 20 according to the present embodiment, the top surface 12 is flat, the second inner wall surface 13 is concave inside, and the second surface 28 is convex inside between the first surface 27 and the lower side 16 of the second inner wall surface 13.

The light-emitting device 20 with this structure includes the lid 11 having the curved second inner wall surface 13. This reduces deformation of the optical waveguide layer 5 under thermal stress and also reduces damage from, for example, cracks at the joint interface between the lid 11 and the cladding 3. This also reduces misalignment between the incident end faces 4*a* to 4*c* of the core 4 and light from the emission portions of the light-emitting elements 10 caused by thermal expansion, thus allowing efficient optical coupling.

Twelfth Embodiment

Figure 22:
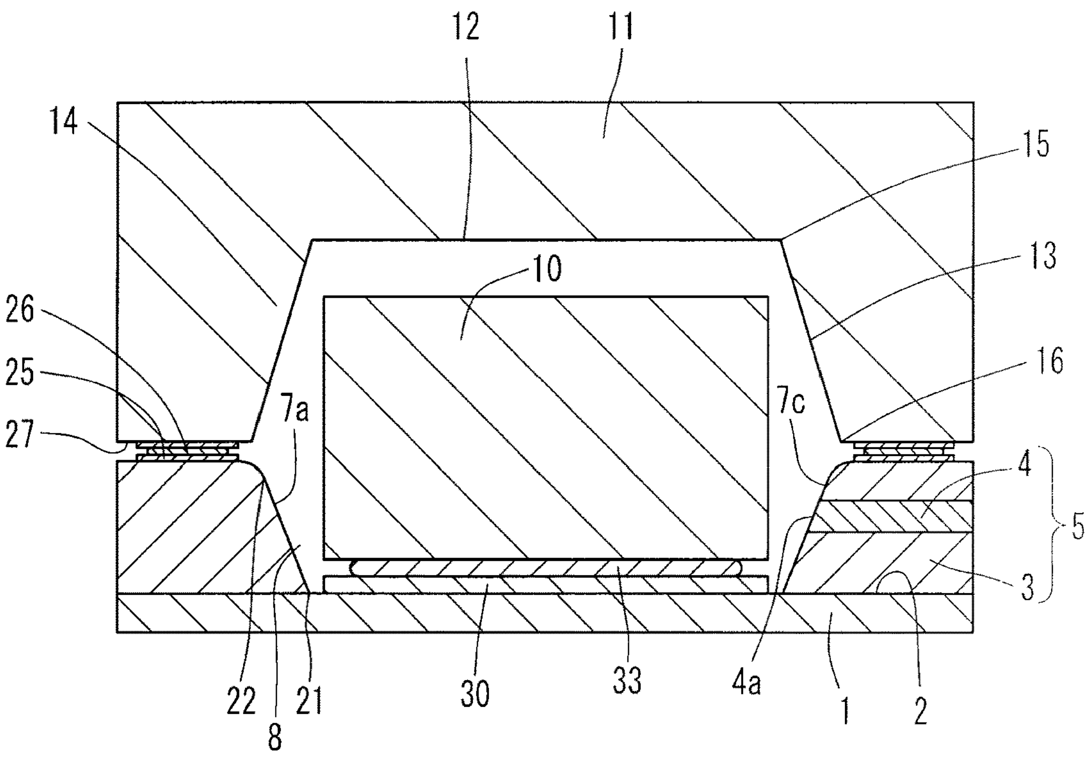
FIG. 22 is an enlarged cross-sectional view of a recess in an optical waveguide package according to a twelfth embodiment of the present disclosure.

FIG. 22 shows a recess in an optical waveguide package according to a twelfth embodiment of the present disclosure. The components corresponding to those in the above embodiments are given the same reference numerals and will not be described repeatedly. In a light-emitting device 20 according to the present embodiment, the optical waveguide layer 5 further includes a lid 11 located over the first recesses 8 and covering the openings of the first recesses 8. The lid 11 has a second recess 14 having a top surface 12 facing the bottom surface 6, and a second inner wall surface 13 surrounding the top surface 12. The second inner wall surface 13 is inclined and has a lower side 16 outward from an upper side 15. Each first recess 8 has a first inner wall surface 7 including wall surfaces 7*a* to 7*d* convex inside.

The light-emitting device 20 with this structure has the first recesses 8, or element-receiving portions, each having an opening defined by a curved edge. This reduces damage from, for example, cracks in the inclined first inner wall surfaces 7 under thermal stress. This also reduces misalignment of the core 4 caused by thermal expansion, thus allowing efficient optical coupling.

Thirteenth Embodiment

Figure 23:
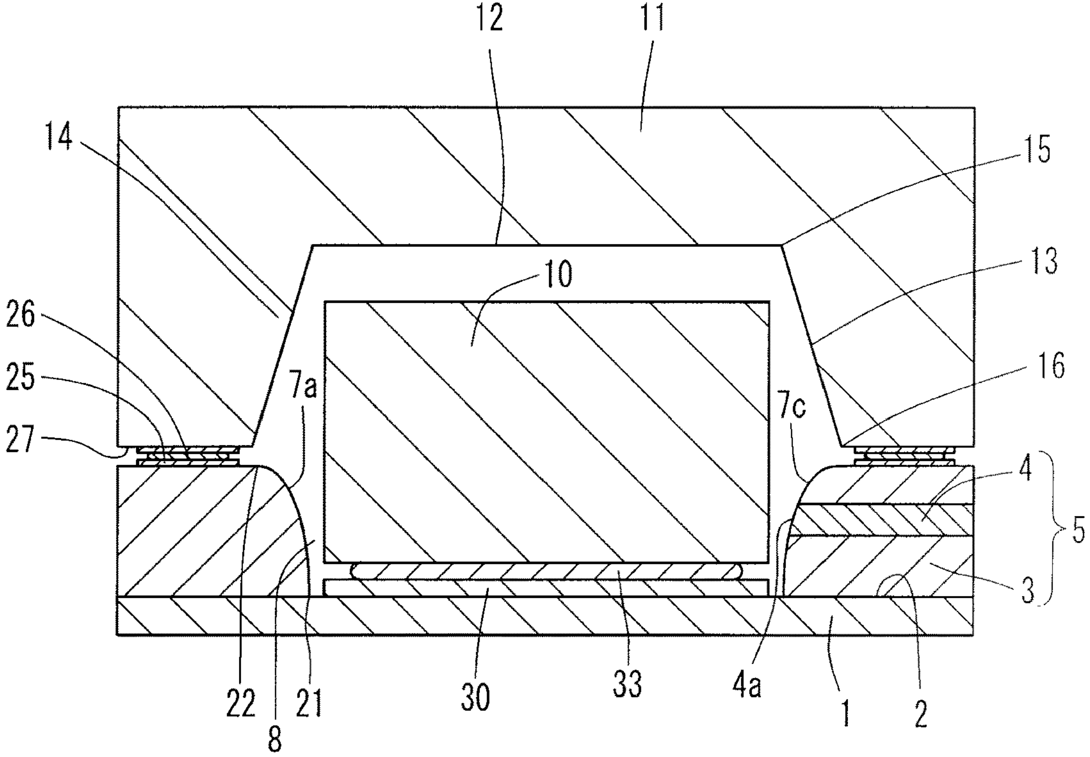
FIG. 23 is an enlarged cross-sectional view of a recess in an optical waveguide package according to a thirteenth embodiment of the present disclosure.

FIG. 23 shows a recess in an optical waveguide package according to a thirteenth embodiment of the present disclosure. The components corresponding to those in the above embodiments are given the same reference numerals and will not be described repeatedly. In a light-emitting device 20 according to the present embodiment, the optical waveguide layer 5 further includes a lid 11 located over the first recesses 8 and covering the openings of the first recesses 8. The lid 11 has a second recess 14 having a top surface 12 facing the bottom surface 6, and a second inner wall surface 13 surrounding the top surface 12. The second inner wall surface 13 is inclined and has a lower side 16 outward from an upper side 15. Each first recess 8 has a first inner wall surface 7 including wall surfaces 7*a* to 7*d* convex inside from an upper side 22 to a lower side 21.

The light-emitting device 20 with this structure includes the optical waveguide layer 5 having the curved first inner wall surfaces 7. This reduces cracks or other damage in the first inner wall surfaces 7 under thermal stress. This also reduces misalignment of the core 4 caused by thermal expansion, thus allowing efficient optical coupling. The core 4 has the incident end faces 4*a* to 4*c* curved to serve as lenses. This allows light from the light-emitting elements 10 to easily enter the core 4. The light-emitting device 20 with this structure causes less light to diffuse outside the core 4.

Fourteenth Embodiment

Figure 24:
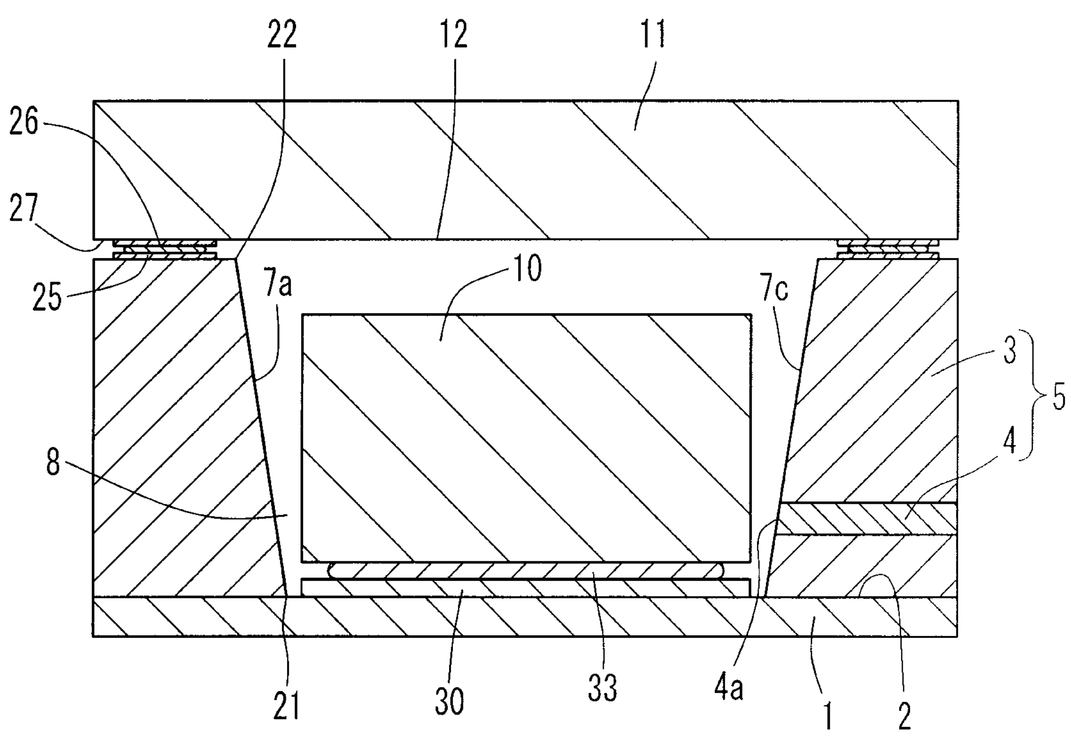
FIG. 24 is an enlarged cross-sectional view of a recess in an optical waveguide package according to a fourteenth embodiment of the present disclosure.

FIG. 24 shows a recess in an optical waveguide package according to a fourteenth embodiment of the present disclosure. The components corresponding to those in the above embodiments are given the same reference numerals and will not be described repeatedly. In a light-emitting device 20 according to the present embodiment, the optical waveguide layer 5 has a height greater than or equal to that of the light-emitting elements 10 and is covered with a plate-like lid 11*a* as in the second embodiment shown in FIG. 16.

The light-emitting device 20 with this structure includes the lid 11*a* with no bend, or in other words, a plate, thus reducing cracks.

Fifteenth Embodiment

Figure 25:
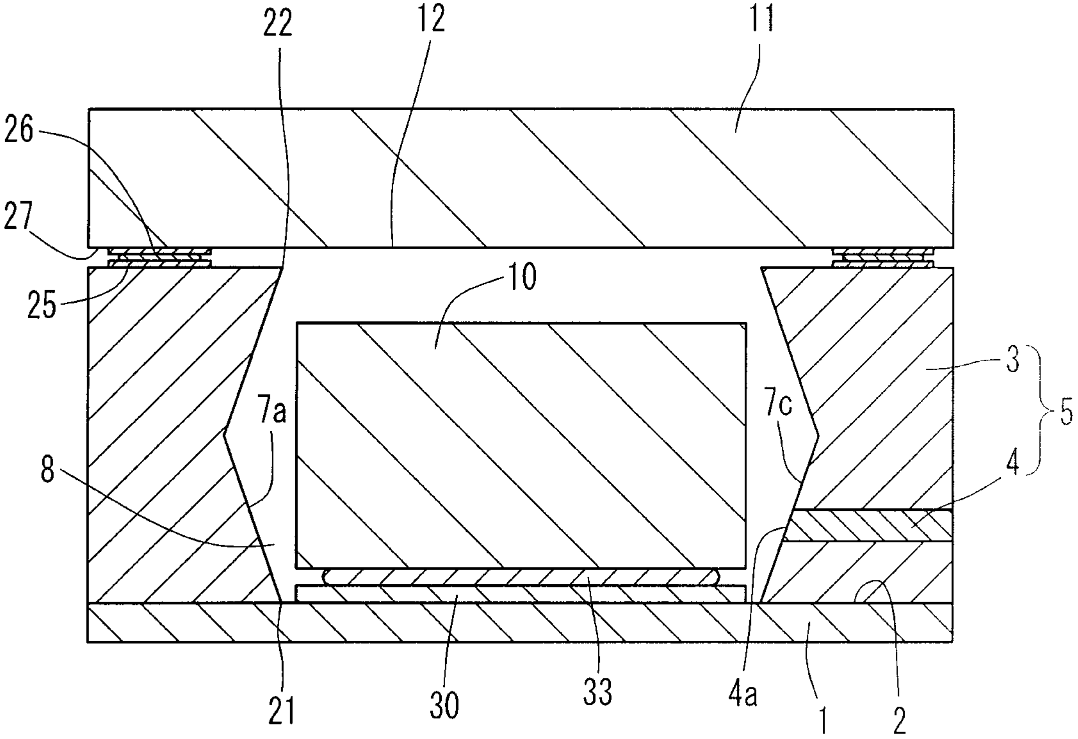
FIG. 25 is an enlarged cross-sectional view of a recess in an optical waveguide package according to a fifteenth embodiment of the present disclosure.

FIG. 25 shows a recess in an optical waveguide package according to a fifteenth embodiment of the present disclosure. The components corresponding to those in the above embodiments are given the same reference numerals and will not be described repeatedly. In a light-emitting device 20 according to the present embodiment, each first recess 8 has a first inner wall surface 7 having an angular recess with a corner.

In the light-emitting device 20 with this structure, the corner is located above the incident end faces 4*a* to 4*c* of the core 4 to allow any stress to concentrate on a portion other than the core 4. This structure has an internal space hexagonal in cross section, as in some of the embodiments described above. This reduces deformation of the first inner wall surfaces 7 and cracks in the lid 11*a* and the first inner wall surfaces 7 under thermal stress.

Sixteenth Embodiment

Figure 26:
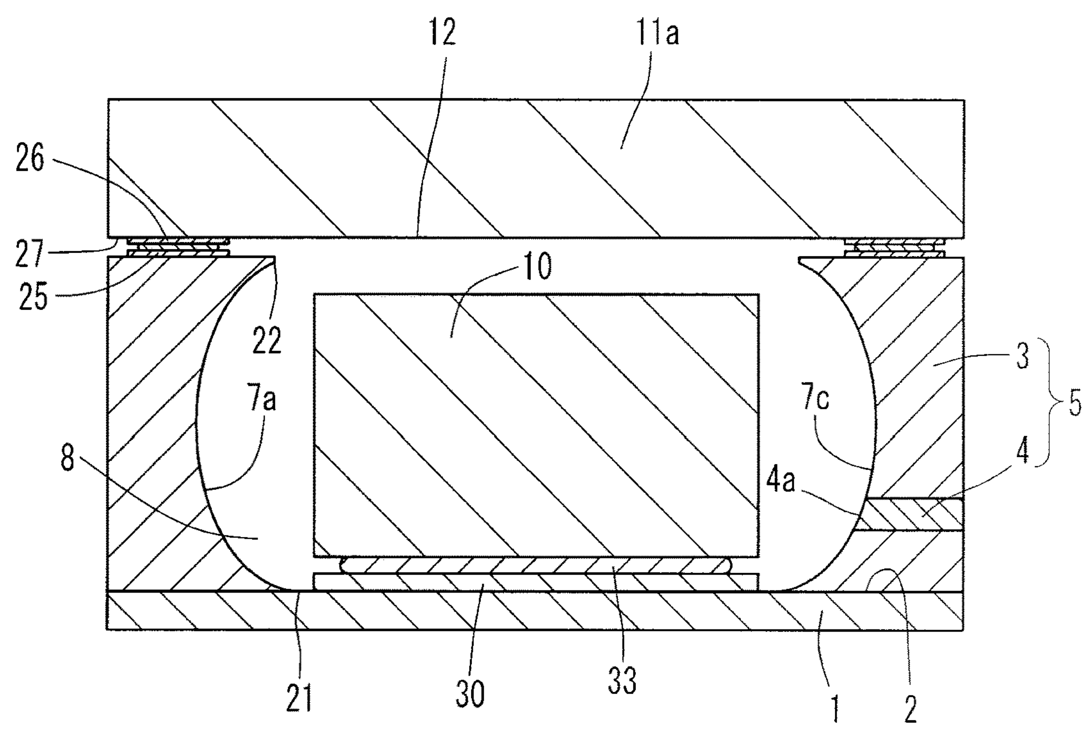
FIG. 26 is an enlarged cross-sectional view of a recess in an optical waveguide package according to a sixteenth embodiment of the present disclosure.

FIG. 26 shows a recess in an optical waveguide package according to a sixteenth embodiment of the present disclosure. The components corresponding to those in the above embodiments are given the same reference numerals and will not be described repeatedly. In a light-emitting device 20 according to the present embodiment, the optical waveguide layer 5 has a height greater than or equal to that of the light-emitting elements 10 and is covered with a plate-like lid 11*a* as in the embodiments shown in FIGS. 16 and 24. The first inner wall surfaces 7 are concave inside.

The light-emitting device 20 with this structure has an internal space with no corner in cross section, unlike a light-emitting device 20 having flat first inner wall surfaces 7. This allows distribution of stress under thermal expansion or contraction to reduce thermal stress, and thus reduces deformation and cracks in the optical waveguide layer 5 and the lid 11.

Seventeenth Embodiment

Figure 27:
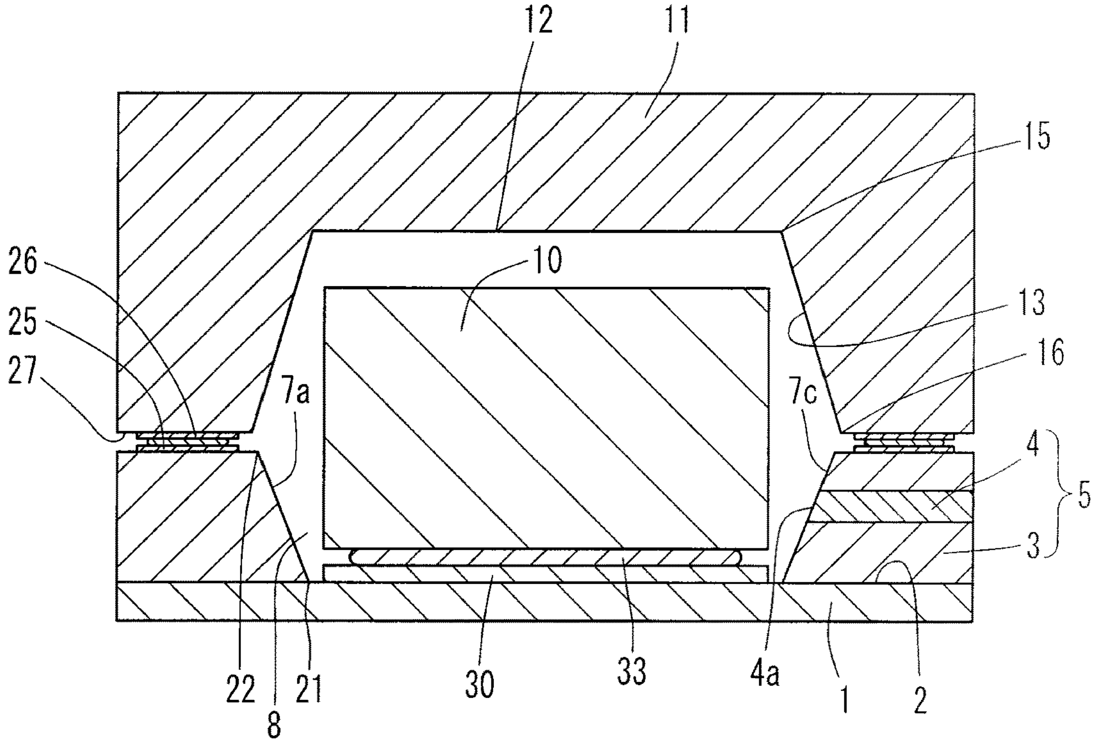
FIG. 27 is an enlarged cross-sectional view of a recess in an optical waveguide package according to a seventeenth embodiment of the present disclosure.

FIG. 27 shows a recess in an optical waveguide package according to a seventeenth embodiment of the present disclosure. The components corresponding to those in the above embodiments are given the same reference numerals and will not be described repeatedly. In a light-emitting device 20 according to the present embodiment, the optical waveguide layer 5 and the lid 11 are formed from the same material. The optical waveguide layer 5 and the lid 11 may be formed from a gas barrier material, such as glass or silicon.

The light-emitting device 20 with this structure reduces the difference in thermal expansion between the optical waveguide layer 5 and the lid 11 and relaxes thermal stress. The light-emitting device 20 thus reduces damage to the lid 11, the optical waveguide layer 5, and their joint interface resulting from deformation. This also reduces misalignment of the core 4 caused by thermal expansion, thus allowing efficient optical coupling.

Eighteenth Embodiment

Figure 28:
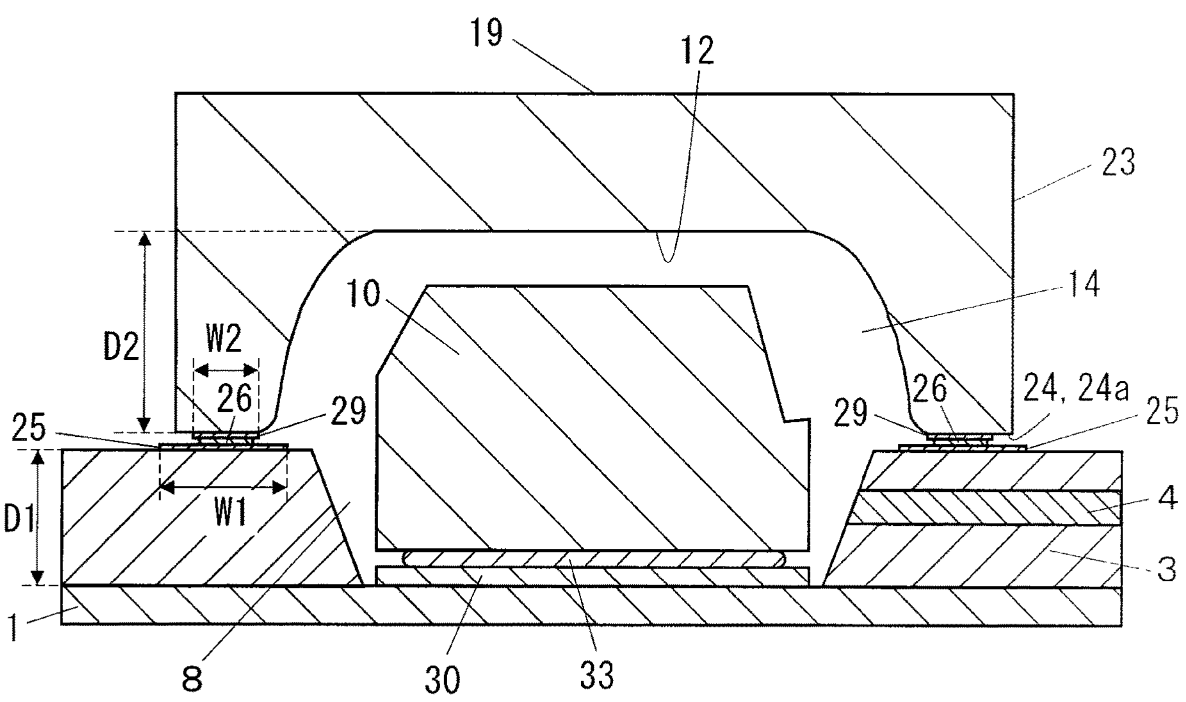
FIG. 28 is an enlarged cross-sectional view of a recess in an optical waveguide package according to an eighteenth embodiment of the present disclosure.
Figure 29:
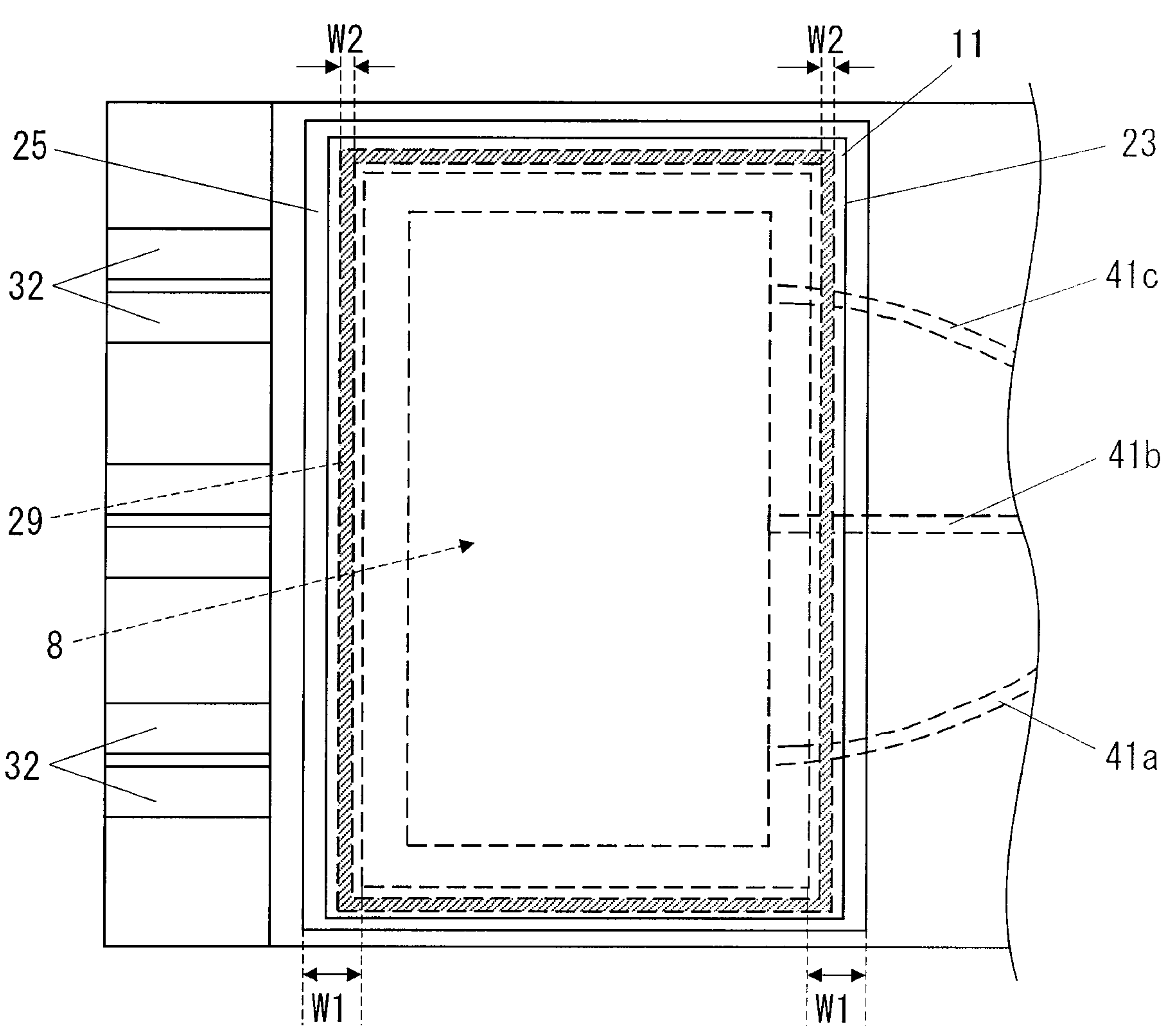
FIG. 29 is a plan view of the recess in the optical waveguide package according to the eighteenth embodiment of the present disclosure.

FIG. 28 shows a recess in an optical waveguide package 50 according to an eighteenth embodiment of the present disclosure. FIG. 29 shows the optical waveguide package 50 according to the eighteenth embodiment of the present disclosure in a plan view. The components corresponding to those in the above embodiments are given the same reference numerals and will not be described repeatedly. The optical waveguide package according to the present embodiment is a variation of the optical waveguide package according to the eleventh embodiment shown in FIG. 21 described above. In the eighteenth embodiment, the first gas barrier layer 25 has an outer edge located outward from the outer edge of the lid 11 in a plan view. In other words, the first gas barrier layer 25 partially protrudes from the lid 11 in a plan view. The outer edge of the lid 11 may also be referred to as a side surface 23. The lid 11 with this structure does not fully cover the first gas barrier layer 25. The lid 11 is thus less likely to be misaligned with the first gas barrier layer 25 when the lid 11 is joined to the first gas barrier layer 25 on the cladding 3 with the bond 26. This can avoid lowering the airtightness of the space defined by the first recess 8 and the second recess 14 caused by any misalignment between the lid 11 and the first gas barrier layer 25. When the first gas barrier layer 25 contains a metal material, heat generated in the light-emitting element 10 is transferred to the first gas barrier layer 25 and dissipates out of the space accommodating the light-emitting element 10 through portions of the first gas barrier layer 25 protruding from the lid 11. This can avoid lowering the emission efficiency of the light-emitting element 10 and avoid operation failures.

As shown in FIGS. 28 and 29, the optical waveguide package 50 according to each embodiment may further include a second gas barrier layer 29. The second gas barrier layer 29 is located on a lower surface 24 of the lid 11 and surrounds the second recess 14. In this case, the second gas barrier layer 29 may be joined to the first gas barrier layer 25 with the bond 26 described above. With the second gas barrier layer 29 joined to the first gas barrier layer 25 with the bond 26, the lid 11 is joined to the cladding 3 airtightly. This allows airtight sealing of the space accommodating the light-emitting element 10, or in other words, the space in the first recess 8 and the second recess 14.

In the optical waveguide package 50 according to the eighteenth embodiment, the first gas barrier layer 25 may have a width W1 greater than or equal to a width W2 of the second gas barrier layer 29 as shown in FIGS. 28 and 29. The first gas barrier layer 25 and the second gas barrier layer 29 with this structure are easily aligned with each other in a plan view and can thus be stably joined together with the bond 26.

In the eighteenth embodiment shown in FIGS. 28 and 29, the first gas barrier layer 25 is spaced from the second recess 14. In some embodiments, the first gas barrier layer 25 may partially overlap the second recess 14. In other words, the first gas barrier layer 25 may be nearer the first recess 8 than the second gas barrier layer 29.

As shown in FIG. 28, the first gas barrier layer 25 may be larger than a first portion 24*a* extending from the outer edge of the second recess 14 to the outer edge of the lower surface 24. In other words, the area surrounded by the first gas barrier layer 25 may be larger than the first recess 8 and smaller than the second recess 14.

The first gas barrier layer 25 may have the width W1 less than the width W2 of the second gas barrier layer 29. The first gas barrier layer 25 with this structure has an inner portion located apart from the light-emitting element 10. This reduces deformation of the first gas barrier layer 25 under heat from the light-emitting element 10. This also reduces deformation of the cladding 3 caused by deformation of the first gas barrier layer 25. When the first gas barrier layer 25 contains a metal, the first gas barrier layer 25 with the above structure uses a smaller amount of the metal material. This reduces the weight of the optical waveguide package 50. The first gas barrier layer 25 may be fully covered with the second gas barrier layer 29 in a plan view.

As shown in FIG. 28, a first bond 26 may be located within the edges of the second gas barrier layer 29. When the first bond 26 protrudes outward from the second gas barrier layer 29, the first bond 26 may come in contact with the lid 11. This may cause tensile stress at the contact between the lid 11 and the first bond 26 when the first bond 26 is cured, possibly damaging the lid 11. The first bond 26 located within the edges of the second gas barrier layer 29 as described above can reduce damage to the lid 11 caused by contact between the lid 11 and the first bond 26.

Nineteenth Embodiment

Figure 30:
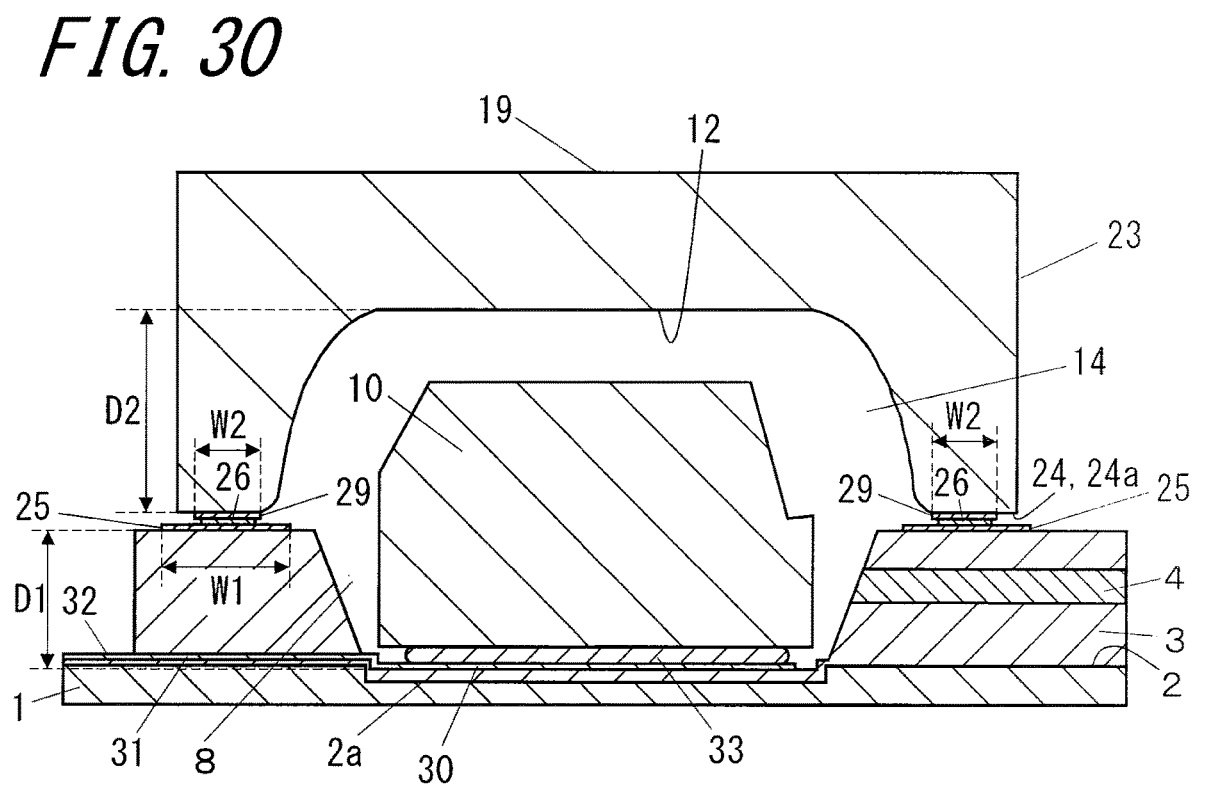

FIG. 30 is a cross-sectional view of a recess in an optical waveguide package 50 according to a nineteenth embodiment of the present disclosure. The components corresponding to those in the above embodiments are given the same reference numerals and will not be described repeatedly. Unlike in other embodiments, a connection pad 30 in the present embodiment is continuous with a conductor extending through the cladding 3. The conductor includes an external connection terminal 32 extending outside the first recess and an internal wiring conductor 31 located in the cladding 3. The connection pad 30 may be continuous with the internal wiring conductor 31. The internal wiring conductor 31 may be continuous with the external connection terminal 32. In one embodiment, the connection pad 30 and the conductor may contain the same metal material. In another embodiment, the connection pad 30 and the conductor may contain different metal materials. More specifically, the connection pad 30 and the conductor may contain different metal materials that are connected together.

As shown in FIG. 30, the cladding 3 may be located below the connection pad 30. In other words, the first recess 8 may not extend through the cladding 3. In this case, the upper surface 2 of the substrate 1 may not be flat and may have, below the first recess 8, a third recess 2*a* with a shape corresponding to the shape of the first recess 8. This structure facilitates alignment between the emission point of the light-emitting element 10 and the core 4.

From another perspective, the cladding 3 with the above structure may be partially located in the third recess 2*a*. With the cladding 3 formed from an insulating material, the connection pad 30 can be on the portion of the cladding 3 located in the third recess 2*a*. The substrate 1 may thus be formed from, for example, a conductive material such as silicon.

The first recess 8 may extend through the cladding 3. The bottom surface of the first recess 8 may define the third recess 2*a*.

Other Variations

Variations other than the above embodiments will now be described. The substrate 1 may be formed from silicon. The lid 11 may also be formed from silicon. Each of the first gas barrier layer 25 and the second gas barrier layer 29 may contain a metal material.

As shown in the figures, the conductive bond 33 may be spaced from the outer edge of the light-emitting element 10. The conductive bond 33 with this structure is less likely to extend to the emission surface of the light-emitting element 10 and is less likely to block light from the light-emitting element 10.

The lid 11 has a second upper surface 19. The inner wall surface of the second recess 14 may have a greater surface roughness than the second upper surface 19. The inner wall surface of the second recess 14 with this structure can diffusely reflect light emitted from the light-emitting element 10. This reduces unintended light from the light-emitting element 10 entering the core 4, and thus reduces the likelihood of the core 4 emitting unexpected light. The above structure can also reduce deterioration of light emitted from the core 4.

The lid 11 has the side surface 23 connecting the second upper surface 19 and the lower surface 24. The side surface 23 may have a greater surface roughness than the second upper surface 19. The side surface 23 with this structure can be held stably to, for example, place the lid 11 on the cladding 3. The lid 11 can thus be placed on the cladding 3 with less likelihood of misalignment. The side surface 23 is nearer the light-emitting element 10 than the second upper surface 19. The side surface 23 with a greater surface roughness than the second upper surface 19 has a larger surface area and can efficiently dissipate heat from the light-emitting element 10.

More specifically, the second upper surface 19 may be a mirror surface. The lid 11 with this structure can be held easily by suction of the second upper surface 19. The lid 11 can thus be placed on the cladding 3 with less likelihood of misalignment. When the lid 11 is formed from a material that transmits infrared rays, such as silicon, the states of the first recess 8 and the second recess 14 can be observed with an infrared camera. This facilitates detection of any misalignment or failures of the light-emitting element 10 after the recesses are sealed with the lid 11, with the second recess 14 having a mirror surface on its inner wall surface including the top surface 12.

The first gas barrier layer 25 and the second gas barrier layer 29 may be formed from the same material. This structure reduces breakage of the joint between the first gas barrier layer 25 and the second gas barrier layer 29 caused by a mismatch between the thermal expansion coefficients of their materials.

As shown in the figures, the second recess 14 may have a depth D2 greater than a depth D1 of the first recess 8. The second recess 14 with the greater depth D2 can define a space for a light-emitting element 10 with any height when the cladding 3 and the core 4 are thin. The cladding 3 and the core 4 formed through complicated processes can be thinner, thus facilitating manufacture of the optical waveguide package 50.

In still another embodiment of the present disclosure, the light-emitting elements 10 are not limited to light-emitting diodes (LEDs) but may be, for example, laser diodes (LDs) or vertical cavity surface emitting lasers (VCSELs).

Although embodiments of the present disclosure have been described in detail, the present disclosure is not limited to the embodiments described above, and may be changed or modified in various manners without departing from the spirit and scope of the present disclosure. The components described in the above embodiments may be entirely or partially combined as appropriate unless any contradiction arises.

REFERENCE SIGNS LIST

1 substrate
2 upper surface
2*a* third recess
3 cladding
3*a* first upper surface
4 core
4*a*, 4*b*, 4*c* incident end face
5 optical waveguide layer
6 bottom surface
7 first inner wall surface
7*a*, 7*b*, 7*c*, 7*d* wall surface
8 first recess
9*ab*, 9*bc*, 9*cd*, 9*ad* corner support surface
10 light-emitting element
11 lid
12 top surface
13 second inner wall surface
14 second recess
15 upper side
16 lower side
17 second space
18 first space
19 second upper surface
20 light-emitting device
21 lower side
22 upper side
23 side surface
24 lower surface
24*a* first portion
25 first gas barrier layer
26 bond
27 first surface
28 second surface
29 second gas barrier layer
30 connection pad
31 internal wiring conductor
32 external connection terminal
33 conductive bond
41*a*, 41*b*, 41*c* branching path
42 emission end face
43 merging portion
44 joined path
45 condenser lens
50 optical waveguide package

The invention claimed is:

1. An optical waveguide package, comprising:
a substrate;
a cladding on the substrate, the cladding having a first upper surface and a first recess being open in the first upper surface;
a core in the cladding;
a connection pad in the first recess, the connection pad being electrically connectable to a light-emitting element; and
a lid on the cladding, the lid having a lower surface facing the first upper surface, the lid having a second recess being open in the lower surface,
wherein the first recess has a larger opening area toward a portion adjacent to the first upper surface from a portion adjacent to the substrate,
the second recess has a smaller opening area away from the first recess,
the second recess has a larger maximum opening area than the first recess,
the second recess fully covers the first recess,
the lid has a second upper surface, and
the second recess has an inner wall surface having a greater surface roughness than the second upper surface.

2. The optical waveguide package according to claim 1, wherein the second recess has a depth (D2) greater than a depth (D1) of the first recess.

3. An optical waveguide package, comprising:

a substrate;

a cladding on the substrate, the cladding having a first upper surface and a first recess being open in the first upper surface;

a core in the cladding;

a connection pad in the first recess, the connection pad being electrically connectable to a light-emitting element; and a lid on the cladding, the lid having a lower surface facing the first upper surface, the lid having a second recess being open in the lower surface, wherein the first recess has a bottom surface and a first inner wall surface surrounding the bottom surface, the second recess has a top surface facing the bottom surface, and a second inner wall surface surrounding the top surface, the first inner wall surface has a first lower side surrounding the bottom surface and a first upper side connected to the first upper surface, and the first inner wall surface is inclined with the first upper side located outward from the first lower side, the second inner wall surface has a second upper side surrounding the top surface and a second lower side connected to the lower surface, and the second inner wall surface is inclined with the second lower side located outward from the second upper side, the second lower side is located outward from the first upper side, the lid has a second upper surface, and the second recess has an inner wall surface having a greater surface roughness than the second upper surface.

4. The optical waveguide package according to claim 3, wherein in a cross-sectional view perpendicular to the first upper surface, a distance (D2) from the lower surface to the top surface is greater than a distance (D1) from the first upper surface to the bottom surface.

5. The optical waveguide package according to claim 3, wherein the second upper side and the top surface are connected to each other with a curved connection portion in between.

6. The optical waveguide package according to claim 1, wherein the lid has a side surface connecting the second upper surface and the lower surface, and the side surface has a greater surface roughness than the second upper surface.

7. The optical waveguide package according to claim 1, wherein the second upper surface is a mirror surface.

8. The optical waveguide package according to claim 1, wherein each of the first gas barrier layer and the second gas barrier layer comprises a metal.

9. The optical waveguide package according to claim 1, wherein the lid has a second upper surface and a side surface connecting the second upper surface and the lower surface, and in a plan view, the second gas barrier layer is spaced from the second recess and the side surface.

10. The optical waveguide package according to claim 1, wherein in a plan view, the first gas barrier layer is fully covered with a first portion extending from an outer edge of the second recess to an outer edge of the lower surface.

11. The optical waveguide package according to claim 1, further comprising:

a first gas barrier layer located on the first upper surface of the cladding and surrounding the first recess, wherein the first gas barrier layer has an outer edge located outward from an outer edge of the lid.

12. The optical waveguide package according to claim 1, wherein the first gas barrier layer has a width (W1) greater than or equal to a width (W2) of the second gas barrier layer.

13. The optical waveguide package according to claim 1, wherein the first gas barrier layer has a width (W1) less than a width (W2) of the second gas barrier layer.

14. The optical waveguide package according to claim 1, wherein the bond is located within edges of the second gas barrier layer.

15. The optical waveguide package according to claim 1, further comprising:

a conductor extending through the cladding and extending outside the first recess, wherein the connection pad is continuous with the conductor.

16. A light-emitting device, comprising:

the optical waveguide package according to claim 1; and a light-emitting element electrically connected to the connection pad.

17. The light-emitting device according to claim 16, further comprising:

a conductive bond electrically connecting the light-emitting element and the connection pad.

18. The light-emitting device according to claim 16, wherein the conductive bond is spaced from an outer edge of the light-emitting element.

19. An optical waveguide package, comprising:

a substrate;

a cladding on the substrate, the cladding having a first upper surface and a first recess being open in the first upper surface;

a core in the cladding;

a connection pad in the first recess, the connection pad being electrically connectable to a light-emitting element;

a lid on the cladding, the lid having a lower surface facing the first upper surface, the lid having a second recess being open in the lower surface;

a first gas barrier layer located on the first upper surface of the cladding and surrounding the first recess;

a second gas barrier layer located on the lower surface of the lid and surrounding the second recess; and a bond bonding the first gas barrier layer and the second gas barrier layer, wherein the first recess has a bottom surface and a first inner wall surface surrounding the bottom surface, the second recess has a top surface facing the bottom surface, and a second inner wall surface surrounding the top surface, the first inner wall surface has a first lower side surrounding the bottom surface and a first upper side connected to the first upper surface, and the first inner wall surface is inclined with the first upper side located outward from the first lower side, the second inner wall surface has a second upper side surrounding the top surface and a second lower side connected to the lower surface, and the second inner wall surface is inclined with the second lower side located outward from the second upper side, and the second lower side is located outward from the first upper side.

* * * * *